(12) United States Patent
Sreekumar et al.

(10) Patent No.: US 9,250,595 B1
(45) Date of Patent: Feb. 2, 2016

(54) CONTROLLING AN ELECTROPHOTOGRAPHIC PRINTER USING AN IMAGE REGION DATABASE

(71) Applicants: Cumar Sreekumar, Penfield, NY (US); James A. Katerberg, Kettering, OH (US)

(72) Inventors: Cumar Sreekumar, Penfield, NY (US); James A. Katerberg, Kettering, OH (US)

(73) Assignee: EASTMAN KODAK COMPANY, Rochester, NY (US)

( * ) Notice: Subject to any disclaimer, the term of this patent is extended or adjusted under 35 U.S.C. 154(b) by 0 days.

(21) Appl. No.: 14/447,680

(22) Filed: Jul. 31, 2014

(51) Int. Cl.
  *B41J 29/38* (2006.01)
  *B41J 29/393* (2006.01)
  *G03G 15/00* (2006.01)

(52) U.S. Cl.
  CPC .................................... *G03G 15/55* (2013.01)

(58) Field of Classification Search
  CPC ................................. B41J 2/2132; B41J 2/21
  USPC ................................................ 347/16, 5, 19
  See application file for complete search history.

(56) References Cited

U.S. PATENT DOCUMENTS

| | | | |
|---|---|---|---|
| 4,566,014 A | 1/1986 | Paranjpe et al. | |
| 5,214,442 A | 5/1993 | Roller | |
| 6,608,641 B1 | 8/2003 | Alexandrovich et al. | |
| 6,728,503 B2 | 4/2004 | Stelter et al. | |
| 7,120,379 B2 | 10/2006 | Eck et al. | |
| 7,969,613 B2 | 6/2011 | Honeck et al. | |
| 2006/0133870 A1 | 6/2006 | Ng et al. | |
| 2008/0278757 A1 | 11/2008 | Wong | |
| 2010/0178084 A1 | 7/2010 | Kang | |
| 2012/0033240 A1 | 2/2012 | Kim | |
| 2012/0050370 A1* | 3/2012 | Iritani et al. | 347/15 |
| 2012/0236331 A1 | 9/2012 | Taig | |
| 2013/0100223 A1* | 4/2013 | Sato et al. | 347/104 |
| 2013/0113857 A1 | 5/2013 | Armbruster et al. | |
| 2013/0251283 A1 | 9/2013 | Atanassov et al. | |
| 2013/0286071 A1 | 10/2013 | Armbruster et al. | |
| 2014/0063099 A1* | 3/2014 | Enge et al. | 347/14 |
| 2015/0116410 A1* | 4/2015 | Armbruster et al. | 347/15 |

* cited by examiner

*Primary Examiner* — Jason Uhlenhake
(74) *Attorney, Agent, or Firm* — Kevin E. Spaulding

(57) ABSTRACT

A method for controlling an electrophotographic printing system to print digital image data for an image region. An image region database stores data characterizing a plurality of reference image regions, each reference image region having one or more associated system control parameters that are appropriate for use in printing the reference image region. The system control parameters can include parameters related to correcting color registration errors. The image region to be printed is compared with the reference image regions in the image region database, and a similar reference image region is selected. The image region is printed using the system control parameters associated with the selected similar reference image region.

25 Claims, 15 Drawing Sheets

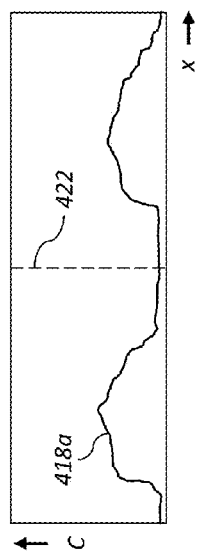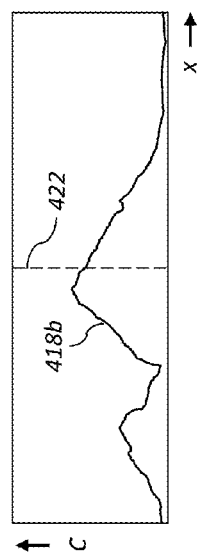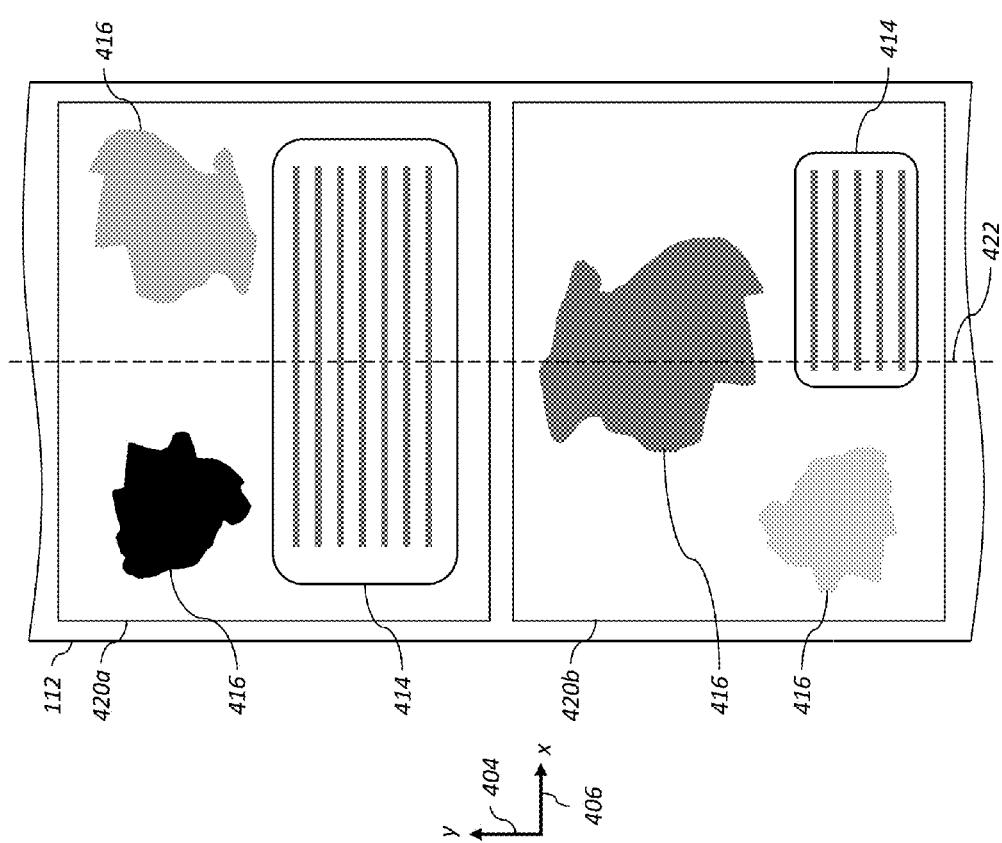

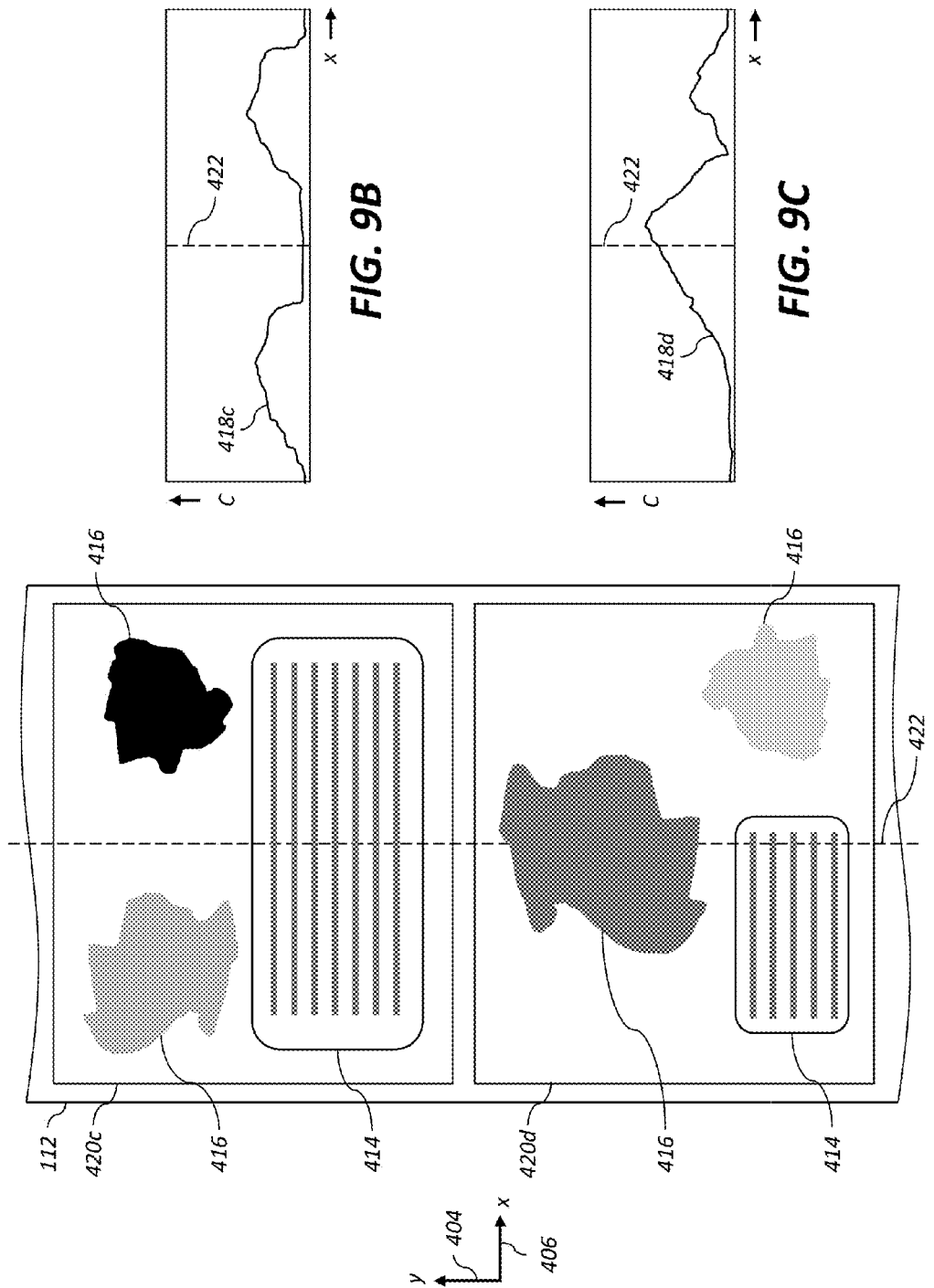

CONTROLLING AN ELECTROPHOTOGRAPHIC PRINTER USING AN IMAGE REGION DATABASE

CROSS REFERENCE TO RELATED APPLICATIONS

Reference is made to commonly assigned, co-pending U.S. patent application Ser. No. 14/447,655, entitled: "Improving document registration using registration error model", by R. Armbruster et al.; to commonly assigned, co-pending U.S. patent application Ser. No. 14/447,661, entitled: "Reducing registration errors using registration error model", by T. Wozniak et al.; to commonly assigned, co-pending U.S. patent application Ser. No. 14/447,669, entitled: "Controlling a printer using an image region database", by C. Sreekumar et al.; to commonly assigned, co-pending U.S. patent application Ser. No. 14/447,686, entitled: "Controlling a web-fed printer using an image region database", by C. Sreekumar et al., each of which is incorporated herein by reference.

FIELD OF THE INVENTION

This invention generally relates to a digital inkjet printing system, and more particularly to performing color-to-color registration correction.

BACKGROUND OF THE INVENTION

In a digitally controlled printing system, a print medium is directed through a series of components. The print medium can be in the form of cut sheets or a continuous web. As the print medium moves through the printing system, colorant, for example, ink, is applied to the print medium by one or more printing stations. In the case of an ink jet printer, the colorant is a liquid ink, and the printing process is commonly referred to as jetting of the ink.

In commercial inkjet printing systems, the print medium is physically transported through the printing system at a high rate of speed. For example, the print medium can travel 650 to 1000 feet per minute. Inkjet lineheads in commercial inkjet printing systems typically include multiple printheads that jet ink onto the print medium as the print medium is being physically moved through the printing system. A reservoir containing ink or some other material is usually behind each nozzle plate in a linehead. The ink streams through the nozzles in the nozzle plates when the reservoirs are pressurized.

The printheads in each linehead in commercial printing systems typically jet only one color. Thus, there is a linehead for each colored ink when different colored inks are used to print content. For example, there are four lineheads in printing systems using cyan, magenta, yellow and black colored inks. The content is printed by jetting the colored inks sequentially, and each colored ink deposited on the print medium is known as a color plane. The color planes need to be aligned (i.e., "registered" with each other) so that the overlapping ink colors produce a quality single image.

Color registration errors can be classified into different types. Examples of color registration errors include, but are not limited to, a color plane having a linear translation with respect to another color plane, a color plane being rotated with respect to another color plane, and a color plane being stretched, contracted, or both stretched and contracted in different regions or in different directions with respect to another color plane.

There are several variables that contribute to the registration errors in color plane alignment including physical properties of the print medium, conveyance of print medium, ink application system, ink coverage, and drying of ink. Color registration errors are typically managed by controlling these variables. However, controlling these variables can often restrict the range of desired print applications. For example, color-to-color registration errors will typically become larger as paper weight for the print application is reduced, when ink coverage is increased, or when the amount of ink coverage is more variable for successive documents. These limitations compromise the range of suitable applications for inkjet printing systems.

There remains a need for improved methods to reduce color registration errors in digital printing systems.

SUMMARY OF THE INVENTION

The present invention represents a method for controlling a digital printing system, comprising:

receiving digital image data for an image region to be printed by the digital printing system;

designating an image region database stored in a processor-accessible memory including data characterizing a plurality of reference image regions, each reference image region having one or more associated system control parameters that are appropriate for use in printing the reference image region on the digital printing system;

using a data processing system to compare the image region to be printed with the reference image regions in the image region database and select a reference image region that is sufficiently similar to the image region to be printed; and using the digital printing system to print the received digital image data for the image region by applying one or more colorants onto a print medium, wherein the digital printing system includes an electrophotographic printing module that is controlled using the system control parameters associated with the selected similar reference image region during the printing of at least a subset of the image region.

This invention has the advantage that performance of an electrophotographic printing system can be improved by creating an image region database containing a library of previously printed image regions for which appropriate system control parameters have been determined. The system control parameters can include registration correction parameters for correcting color-to-color registration errors.

It has the additional advantage that color registration errors can be reduced the first time that a print job is printed without needing to measure actual registration errors in a first copy of a print job so that they can be corrected in subsequent copies.

BRIEF DESCRIPTION OF THE DRAWINGS

FIG. 8A shows a portion of an exemplary print job including two documents;

FIGS. 8B and 8C show ink coverage profiles corresponding to the documents of FIG. 8A;

FIG. 9A shows a portion of an exemplary print job including two documents;

FIGS. 9B and 9C show ink coverage profiles corresponding to the documents of FIG. 9A;

It is to be understood that the attached drawings are for purposes of illustrating the concepts of the invention and may not be to scale. Identical reference numerals have been used, where possible, to designate identical features that are common to the figures.

DETAILED DESCRIPTION OF THE INVENTION

Figure 1:
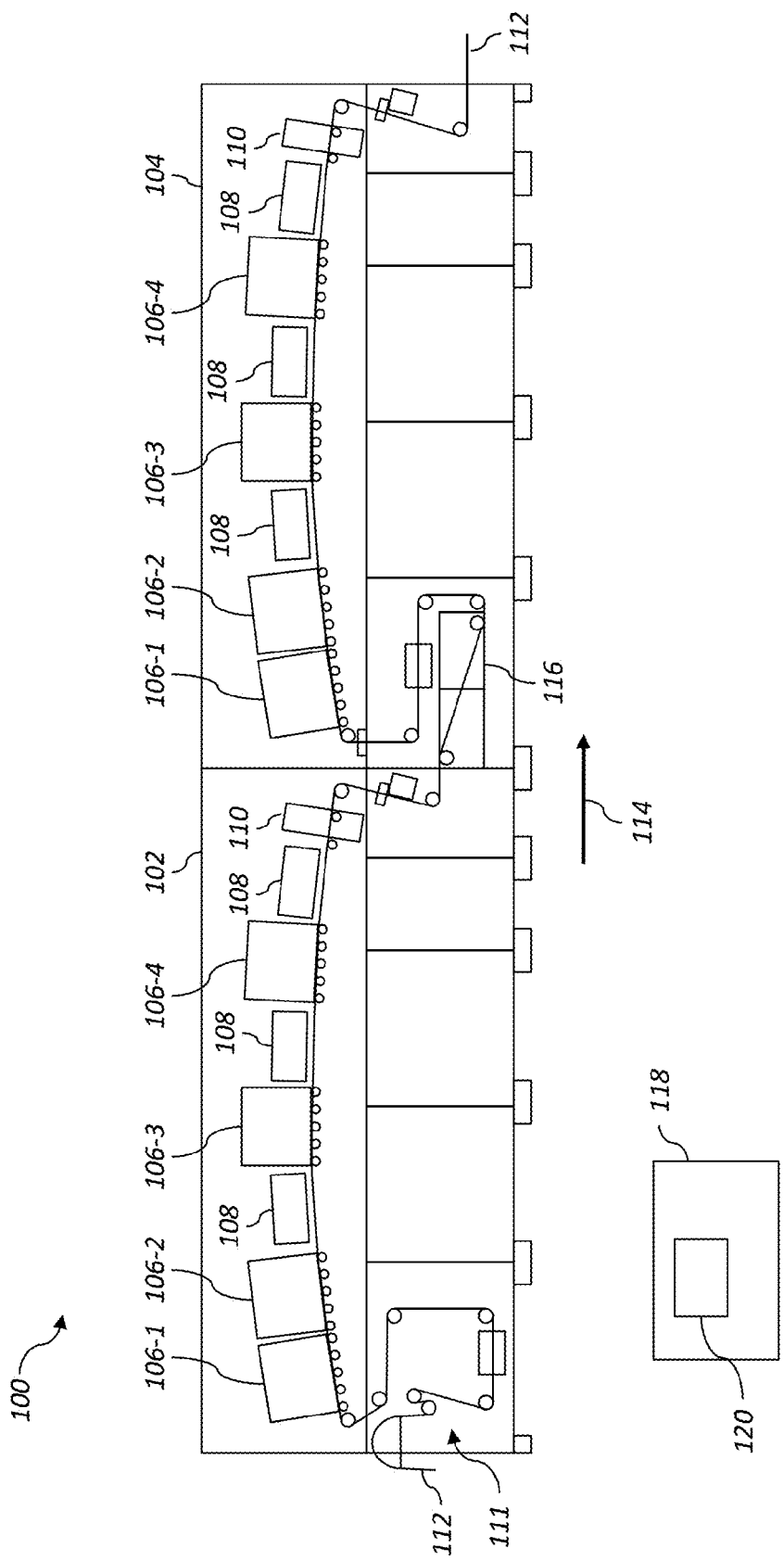
FIG. 1 is a schematic of a continuous-web inkjet printing system.

The present description will be directed in particular to elements forming part of, or cooperating more directly with, apparatus in accordance with the present invention. It is to be understood that elements not specifically shown or described may take various forms well known to those skilled in the art.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Where they are used, terms such as "first", "second", and so on, do not necessarily denote any ordinal or priority relation, but are simply used to more clearly distinguish one element from another.

The present invention is well-suited for use in roll-fed inkjet printing systems that apply colorant (e.g., ink) to a web of continuously moving print media. In such systems a printhead selectively moistens at least some portion of the media as it moves through the printing system, but without the need to make contact with the print media. While the present invention will be described within the context of a roll-fed inkjet printing system, it will be obvious to one skilled in the art that it could also be used for other types of printing systems as well.

In the context of the present invention, the terms "web media" or "continuous web of media" are interchangeable and relate to a media that is in the form of a continuous strip of media as it passes through the web media transport system from an entrance to an exit thereof. The continuous web media serves as the receiver medium (e.g., print media) to which one or more colorants (e g, inks or toners), or other coating liquids are applied. This is distinguished from various types of "continuous webs" or "belts" that are transport system components (as compared to the image receiving media) which are typically used to transport a cut sheet medium in an electrophotographic or other printing system.

The example aspects of the present invention are illustrated schematically and not necessarily to scale for the sake of clarity. One of ordinary skill in the art will be able to readily determine the specific size and interconnections of the elements of the example aspects of the present invention.

As described herein, exemplary aspects of the present invention are applied to color plane registration in inkjet printing systems. The example aspects of the present invention are also applied to the registration or stitching of print swaths of the individual printheads that are aligned relative to each other in a linehead. For simplicity, the term registration shall be applied both the registration of print swaths printed by the printheads within a linehead and to the registration of color planes printed by different lineheads.

Inkjet printing is commonly used for printing on paper. However, printing can occur on any substrate or receiving medium. For example, vinyl sheets, plastic sheets, glass plates, textiles, paperboard, and corrugated cardboard can comprise the print medium. In addition to conventional inkjet printing, many applications are emerging which use inkjet printheads or similar nozzle arrays to emit fluids (other than inks) that need to be finely metered and deposited with high spatial precision. Such liquids include inks, both water based and solvent based, that include one or more dyes or pigments. These liquids also include various substrate coatings and treatments, various medicinal materials, and functional materials useful for forming, for example, various circuitry components or structural components. In addition, a nozzle array can jet out gaseous material or other fluids. As such, as described herein, the terms "liquid", "ink" and "inkjet" refer to any material that is ejected by a nozzle array. While the invention will be described in terms of a multi-color printer, it should be understood that the invention similarly applies to other applications such as the printing of multiple layers of an electronic circuit where the individual circuit layers would correspond to an image plane in the color printer. In such applications, registration of the individual layers must be maintained for proper operation of the electronic circuit in a similar manner to the registration of the color image planes in the color prints. It is anticipated that many other applications may be developed in which the invention may be employed to enhance the registration of the image planes.

Inkjet printing is a non-contact application of an ink to a print medium. Typically, one of two types of inkjetting mechanisms are used and are categorized by technology as either "drop on demand" inkjet or "continuous inkjet". The first technology, drop-on-demand inkjet printing, provides ink drops that impact upon a recording surface using a pressurization actuator, for example, a thermal, piezoelectric, or electrostatic actuator. One commonly practiced drop-on-demand technology uses thermal actuation to eject ink drops from a nozzle. A heater, located at or near the nozzle, heats the ink sufficiently to boil, forming a vapor bubble that creates enough internal pressure to eject an ink drop. This form of inkjet is commonly termed "thermal inkjet."

The second technology, commonly referred to as continuous inkjet printing, uses a pressurized ink source to produce a continuous liquid jet stream of ink by forcing ink, under pressure, through a nozzle. The stream of ink is perturbed using a drop forming mechanism such that the liquid jet breaks up into drops of ink in a predictable manner. One continuous printing technology uses thermal stimulation of the liquid jet with a heater to form drops that eventually become print drops and non-print drops. Printing occurs by selectively deflecting drops so that print drops reach the print medium and non-print drops are caught by a collection mechanism. Various approaches for selectively deflecting drops have been developed including electrostatic deflection, air deflection, and thermal deflection.

Additionally, there are typically two types of print media used with inkjet printing systems. The first type is commonly referred to as a continuous web of print media, while the second type is commonly referred to as cut sheets of print media. The continuous web of print media refers to a continuous strip of print media, generally originating from a source roll. The continuous web of print media is moved relative to the inkjet printing system components via a web transport system, which typically includes drive rollers, web guide rollers, and web tension sensors. Cut sheets refer to individual sheets of print media that are moved relative to the inkjet printing system components via a support mechanism (e.g., rollers and drive wheels or a conveyor belt system) that is routed through the inkjet printing system.

The invention described herein is generally applicable to both types of printing technologies. As such, the terms linehead and printhead, as used herein, are intended to be generic and not specific to either technology. Additionally, the invention described herein is applicable to both types of print medium. As such, the terms print medium and web, as used herein, are intended to be generic and not as specific to one type of print medium or web or the way in which the print medium or web is moved through the printing system. Additionally, the terms linehead, printhead, print medium, and web can be applied to other nontraditional inkjet applications, such as printing conductors on plastic sheets.

The terms "color plane" and "image plane" are used generically and interchangeably herein to refer to a portion of the data that is used to specify the location of features that are made by a particular printing station of a digitally controlled printing system on the print medium. Similarly, "color-to-color registration" is used generically herein to refer to the registration of such features that are made by different printing stations on the print medium. For the color printing of images, the patterns of ink printed by different printheads in printing the same or different colors must be registered with each other to provide a high quality image. An example of a non-color printing application is functional printing of a circuit. The patterns of material printed by different printheads (i.e., the image planes), form directly or serve as catalysts or masks for the formation of different layers of deposited conductive materials, semiconductor materials, resistive materials, insulating materials of various dielectric constants, high permeability magnetic materials, or other types of materials, must also be registered to provide a properly functioning circuit. The terms color plane and color-to-color registration can also be used herein to refer to the mapping and registration of pre-print or finishing operations, such as the mapping of where the folds or cutting or slitting lines are, or the placement of vias in an electrical circuit.

The terms "upstream" and "downstream" are terms of art referring to relative positions along the transport path of the print medium; points on the transport path move from upstream to downstream. In FIGS. 1-6, a print medium 112 moves along a transport path from upstream to downstream in a transport direction 114.

The schematic side view of FIG. 1 shows one example of a continuous web inkjet printing system 100. Printing system 100 includes a first print module 102 and a second print module 104, each of which includes lineheads 106-1, 106-2, 106-3, 106-4, dryers 108, and a quality control sensor 110. Each linehead 106-1, 106-2, 106-3, 106-4 typically includes multiple printheads (not shown) that apply ink or another fluid (gas or liquid) to the surface of the print medium 112 that is adjacent to the printheads. In the illustrated aspect, each linehead 106-1, 106-2, 106-3, 106-4 applies a different colored ink to the surface of the print medium 112 that is adjacent to the lineheads 106-1, 106-2, 106-3, 106-4. By way of example only, linehead 106-1 applies cyan colored ink, linehead 106-2 magenta colored ink, linehead 106-3 yellow colored ink, and linehead 106-4 black colored ink. The portion of the transport path in each print module 102, 104 from the first linehead 106-1 through the last linehead 106-4 is called a "print zone."

The printing system 100 also include a web tension system 111 (portions of which are shown in FIG. 1) that serves to move the print medium 112 through the printing system 100 in a controlled fashion along the transport path in the transport direction 114 (generally left-to-right as in FIG. 1). The print medium 112 enters the first print module 102 from a source roll (not shown) and the lineheads 106-1, 106-2, 106-3, 106-4 of the first print module 102 apply ink to one side of the print medium 112. As the print medium 112 feeds into the second print module 104, a turnover module 116 is adapted to invert or turn over the print medium 112 so that the lineheads 106-1, 106-2, 106-3, 106-4 of the second print module 104 can apply ink to the other side of the print medium 112. The print medium 112 then exits the second print module 104 and is collected by a print medium receiving unit (not shown).

A processing system 118 can be connected to various components in the web tension system 111 and used to control the positions of the components, such as gimbaled or caster rollers. Processing system 118 can also be connected to the quality control sensors 110 and used to process images or data received from the quality control sensors 110. The processing system 118 can also be connected to components in printing system 100 using any known wired or wireless communication connection. Processing system 118 can be separate from printing system 100 or integrated within printing system 100 or within a component in printing system 100. In various embodiments, the processing system 118 can include a single processor, or can include a plurality of processors. Each of the one or more processors can be separate from the printing system 100 or integrated within the printing system 100.

A storage system 120 is connected to the processing system 118. The storage system 120 can store color plane correction values in an aspect of the invention. The storage system 120 can include one or more external storage devices; one or more storage devices included within the processing system 118; or a combination thereof. In some embodiments, the storage system 120 can include its own processor, and can have memory accessible by the one or more processors in the processing system 118. As will be discussed in more detail later, in accordance with embodiments of the invention, the storage system 120 can be used to store data useful for determining appropriate registration corrections for documents in a print job.

Figure 2:
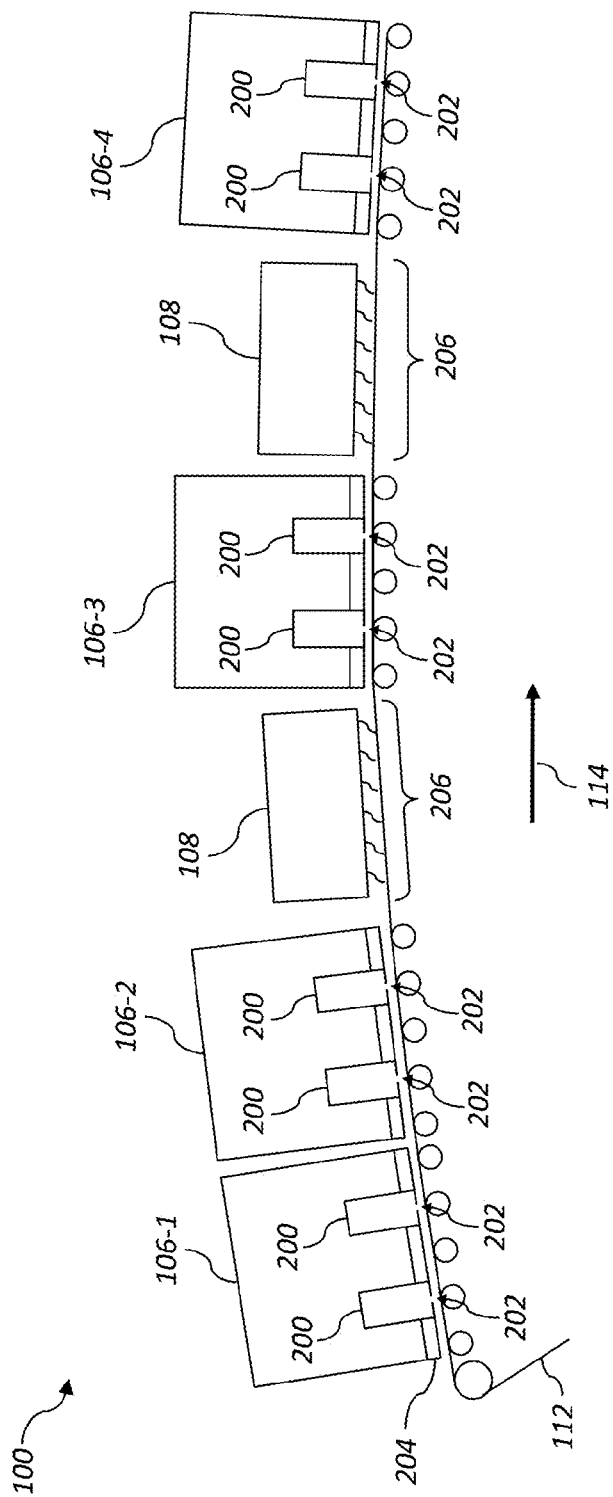
FIG. 2 is a schematic showing additional details for a portion of the printing system of FIG. 1.

FIG. 2 illustrates a portion of the printing system 100 in greater detail. As the print medium 112 is moved through printing system 100, the lineheads 106-1, 106-2, 106-3, 106-

4, which typically include a plurality of individual printheads 200, apply ink or another fluid onto the print medium 112 via nozzle arrays 202 of the printheads 200. The printheads 200 within each linehead 106-1, 106-2, 106-3, 106-4 are located and aligned by a support structure 204 in the illustrated aspect. After the ink is jetted onto the print medium 112, the print medium 112 passes beneath the one or more dryers 108 which apply heat 206 or air to the ink on the print medium 112 to remove at least a portion of the moisture. For example, inks typically include colorant particles in a carrier liquid. In this case, the dryer 108 is used to remove carrier liquid from the print medium 112.

Figure 3:
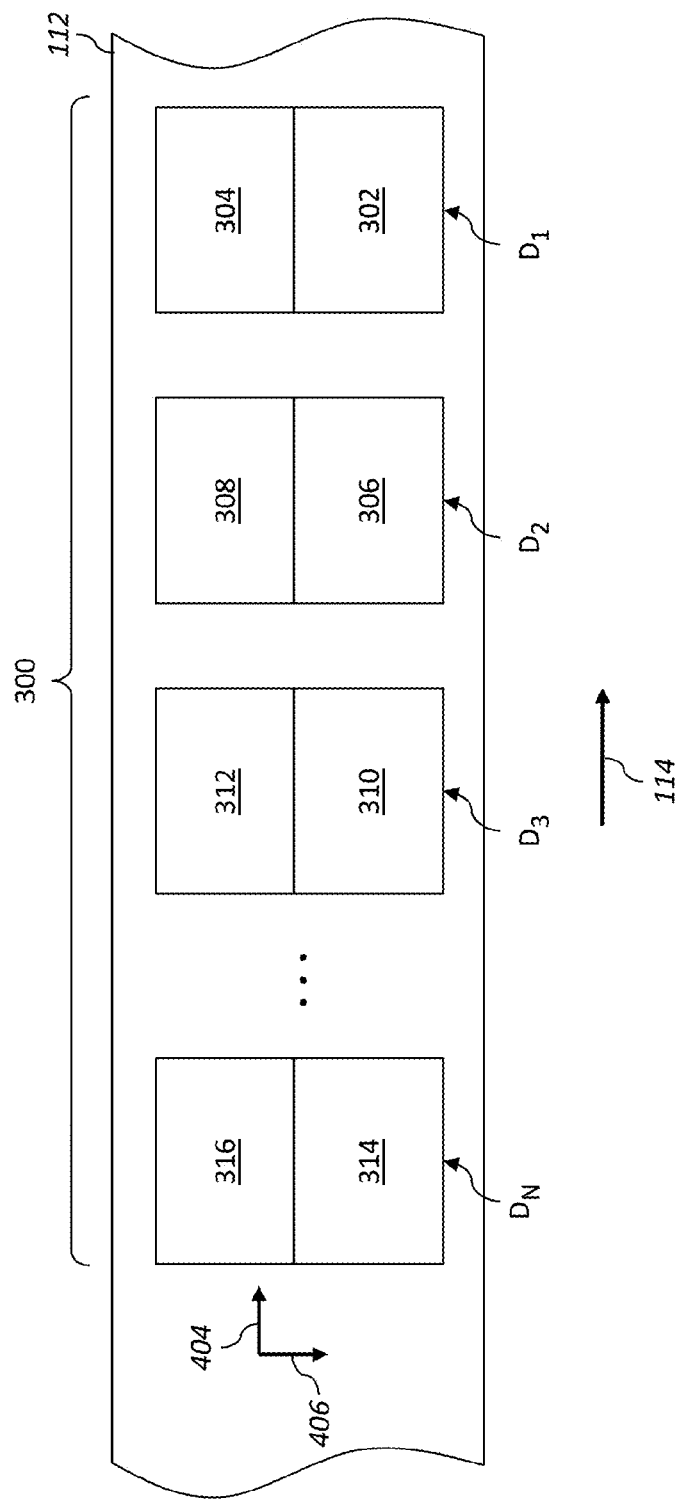
FIG. 3 illustrates a print job including a number of documents.

Referring now to FIG. 3, there is shown one example of a print job 300 including a number of documents $D_1$, $D_2$, $D_3$, ... $D_N$ to be printed in sequence. As used herein, the term "print job" refers to a collection of documents to be printed in sequence. A "document" can include any printed output such as, for example, text, graphics, or photos, individually or in various combinations. The printed output can be disposed anywhere on the print medium 112, and the printed output in each document can differ from the printed content in the other documents in a print job 300. The print job 300 can include a subset of the collection of documents that are printed multiple times with the documents in the subset being printed in the same sequential order each time the subset is printed, but is not limited to such repeated sequence of documents. A print job 300 comprising the printing of multiple copies of a book is an example of a print job 300 that includes a subset of the collection of documents that are printed multiple times with the documents in the subset being printed in the same sequential order each time the subset is printed. Each document can be made up of one or more pages of information across the width of the print medium 112, each document in FIG. 3 comprises two pages printed side by side. In this example, document $D_1$ includes pages 302, 304, document $D_2$ includes pages 306, 308, document $D_3$ includes pages 310, 312, and document $D_N$ includes pages 314, 316.

When the print job 300 is printed, the total amount of ink printed on the print medium 112 can vary significantly from document to document within the print job 300. Furthermore, the spatial distribution of the ink applied to the print medium 112 within the documents can vary significantly within each document. In turn, the aqueous component of the ink is absorbed into the print medium 112 and can cause the print medium 112 to swell and stretch, especially with water-based ink or in high ink laydown regions of the printed content (e.g., an image with a lot of dense black background). Stretch can be higher in the in-track direction 404 (i.e., the transport direction 114) than in the cross-track direction 406. Non uniform swell or stretch of the print medium 112 can cause the print medium 112 to drift laterally as it moves through the printing system. As the image content changes from document to document, different portions along the length of the print medium 112 can drift back and forth in the cross-track direction 406.

Additionally, drying of the print medium 112 can cause the print medium 112 to shrink. When the print medium 112 is heated in between lineheads 106-1, 106-2, 106-3, 106-4 (FIG. 1), regions of the print medium 112 can be stretched and shrunk one or more times as the print medium 112 moves through the printing system 100 (FIG. 1).

Printing with several color planes, in which each color record is printed sequentially, requires color laydown registration. Unanticipated or unaccounted for stretch or shrink in the print medium 112 can produce a loss of color registration and can lead to blurry content or hue degradation. Additionally, printing on both sides of the print medium 112 usually requires front-to-back registration, and the second side of the print medium 112 is usually printed significantly later than the first side.

Figure 4:
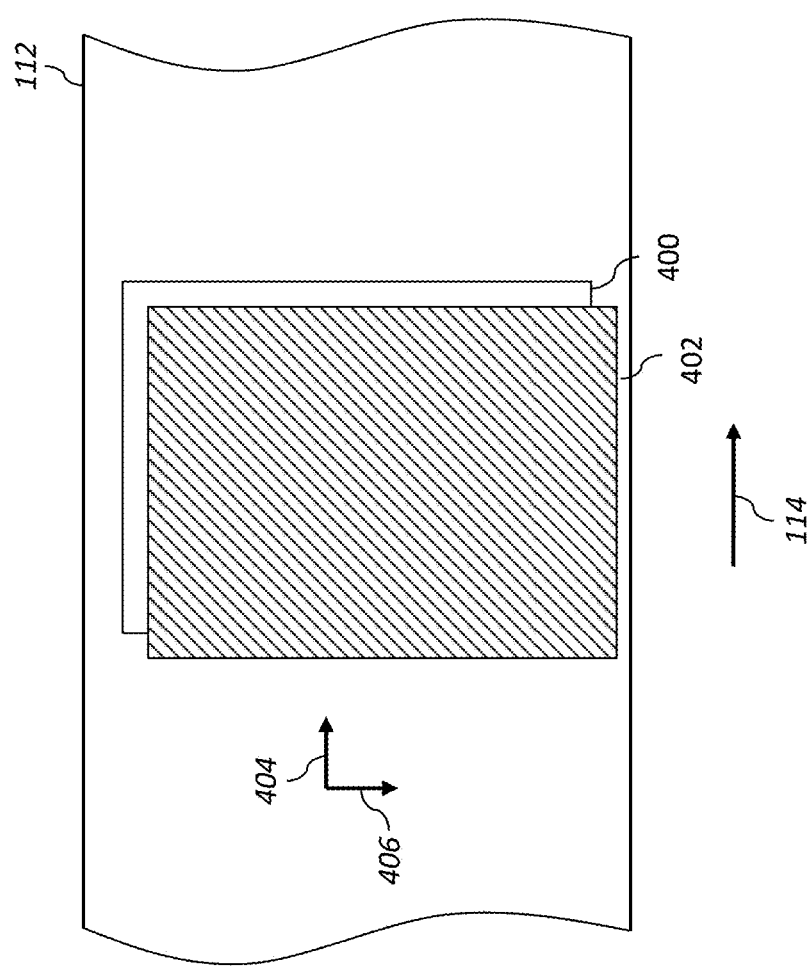
FIG. 4 illustrates a color registration error produced by the translation of one color plane relative to another color plane.

Translation is one type of color registration error. FIG. 4 depicts one example of cross-track and in-track color registration errors produced by the translation of one color plane relative to another color plane. Typically, one color plane (e.g., black) is used as a reference color plane 400 from which the color registration errors can be measured. In various embodiments, the reference color plane 400 can be the first color plane to be printed, the last color plane to be printed, or it can be printed at any other point in the sequence of printed color planes. Errors in registration for the remaining color planes can be determined by comparing each color plane to the reference color plane. In this example, the image content in color plane 402 is translated (i.e., shifted) with respect to the reference color plane 400. In the illustrated example, color plane 402 has color registration errors in both the in-track direction 404 and the cross-track direction 406.

Figure 5:
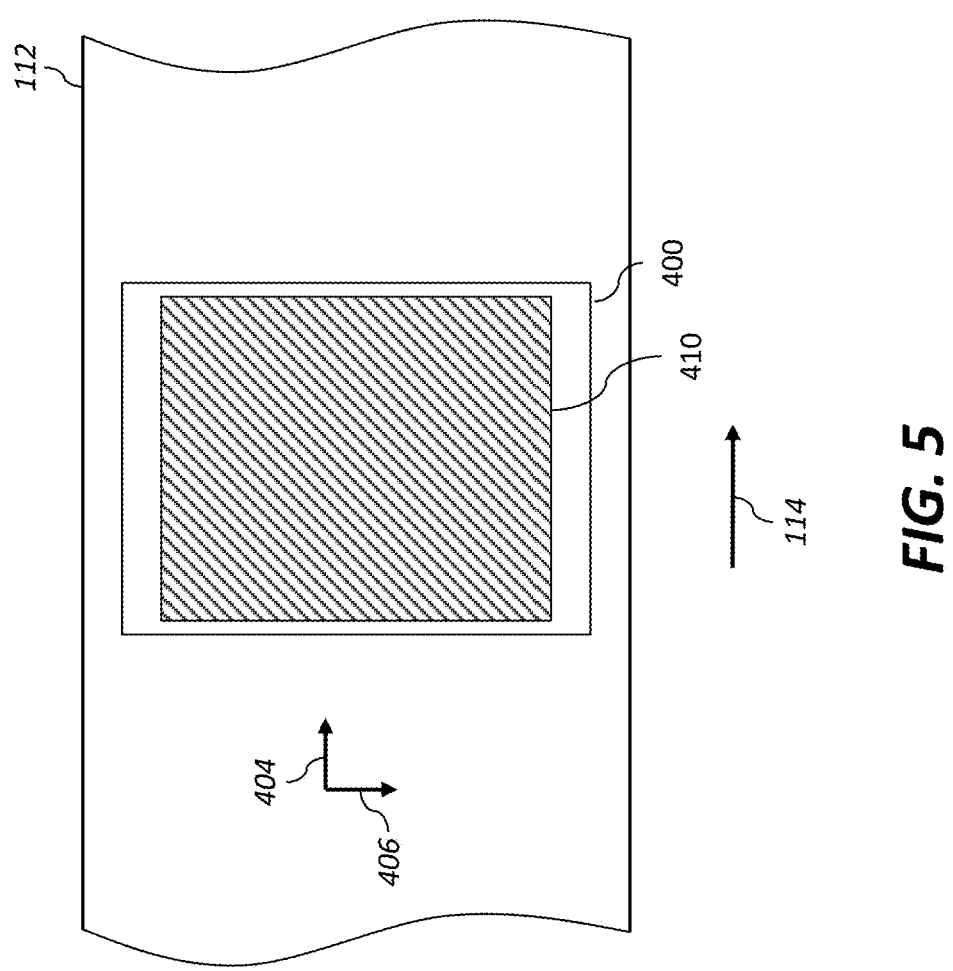
FIG. 5 illustrates a color registration error produced by the contraction or expansion of one color plane relative to another color plane.

Stretch and contraction represent another type of color registration error. FIG. 5 depicts an example color registration errors caused by the stretch or contraction of one color plane relative to another color plane. The different color planes can be stretched or contracted by different amounts in the in-track direction 404 and the cross-track direction 406. In this example, color plane 410 is contracted in both the in-track direction 404 and the cross-track direction 406 with respect to the reference color plane 400.

Figure 6:
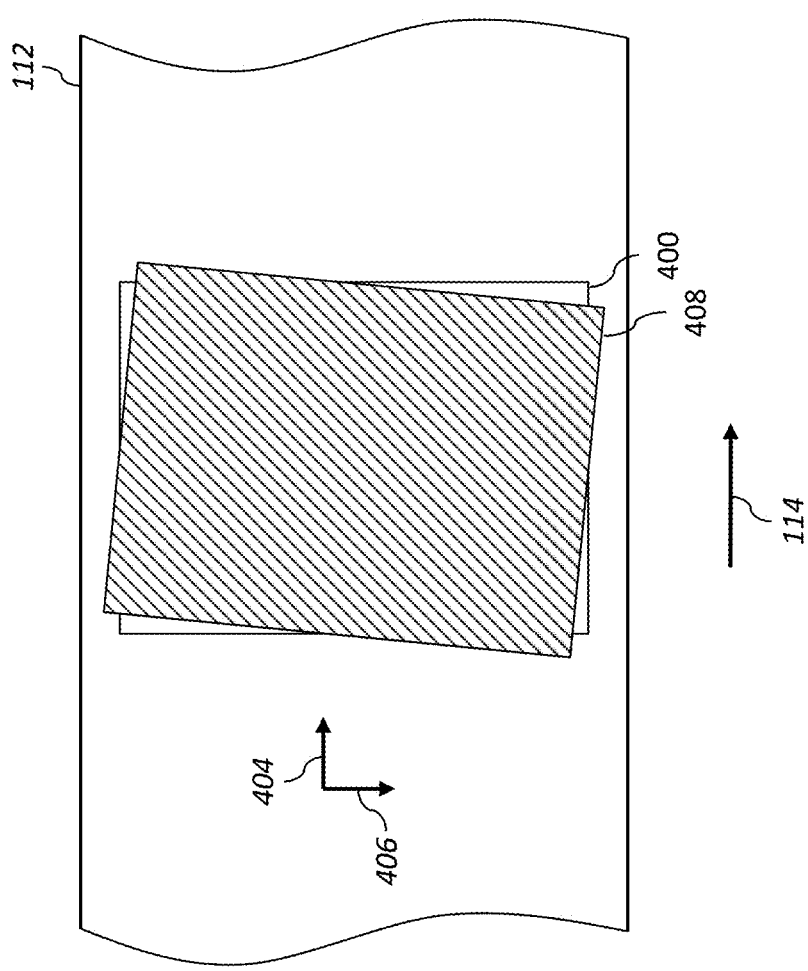
FIG. 6 illustrates a color registration error produced by the rotation of one color plane relative to another color plane.

Rotation or skew is another type of color registration error. FIG. 6 depicts an example of registration errors resulting from the rotation of one color plane relative to another color plane. In this example, the color plane 408 is rotated with respect to the reference color plane 400. Rotation errors result in registration errors in both the in-track direction 404 and the cross-track direction 406.

The stretching or shrinking can occur in the in-track direction 404, the cross-track direction 406, or both the in-track direction 404 and the cross-track direction 406. In some cases, one color plane can contract in one direction (e.g., the cross-track direction 406) and stretch in the other direction (e.g., the in-track direction 404). These shifts and distortions need not be uniform across the document. As a result, certain regions of a document may exhibit expansion while other regions may exhibit no expansion, or may even show contraction. In some cases, the registration errors can include combinations of the types of color registration errors shown in FIGS. 4-6, or can include different types of color registration errors.

As disclosed in commonly-assigned U.S. Patent Application Publication 2013/0286071 to Armbruster et al., entitled "Color-to-color correction in a printing system," it has been found that when printing multiple copies of a sequence of documents, the registration errors can vary widely from document to document within the sequence, but for any given document within the sequence registration errors are generally consistent from one copy of the sequence of documents to the next. Armbruster et al. make use of this consistency to improve color-to-color registration. To provide good color-to-color registration the registration errors for each individual document within the repeated set are measured while the first copy of the repeated set is being printed. Registration corrections are then determined and applied to the color planes of each individual document of the repeated set when subsequent copies are printed based on the measured registration errors for the corresponding documents in the first copy. This can provide significant reductions in the registration errors for each copy after the initial copy.

In commonly assigned U.S. patent application Ser. No. 14/063,406 entitled "Color-to-color correction in a printing system," which is incorporated herein by reference, Armbruster et al. extended the invention described in the aforementioned U.S. Patent Application Publication 2013/0286071 by recognizing that small changes in the printed content of an individual document in a repeated set have little effect on the registration, provided that the changes in printed content doesn't significantly affect the amount and distribution of ink on the printed document. Accordingly, the same registration corrections can be applied to the sequence documents in the subsequent print jobs, even if the documents are slightly different than the corresponding documents in the first print job. This approach is well-suited for applications where the same basic print job may be printed repeatedly with only small changes, such as the name and address on a form letter to be distributed using a bulk mailing. Related inventions are described in commonly-assigned U.S. patent application Ser. No. 14/063,276, U.S. patent application Ser. No. 14/063,331, U.S. patent application Ser. No. 14/063,351, and U.S. patent application Ser. No. 14/063,374, all to Armbruster et al., each of which is incorporated herein by reference.

The present invention addresses the more general problem of determining appropriate registration corrections for non-repeating print jobs where a particular print job can include documents that are significantly different than those in the previous print job. To solve this problem, the inventors have recognized that the registration errors observed for previous print jobs can be used to predict the registration errors for image regions in future print jobs that have similar image characteristics.

Figure 7:
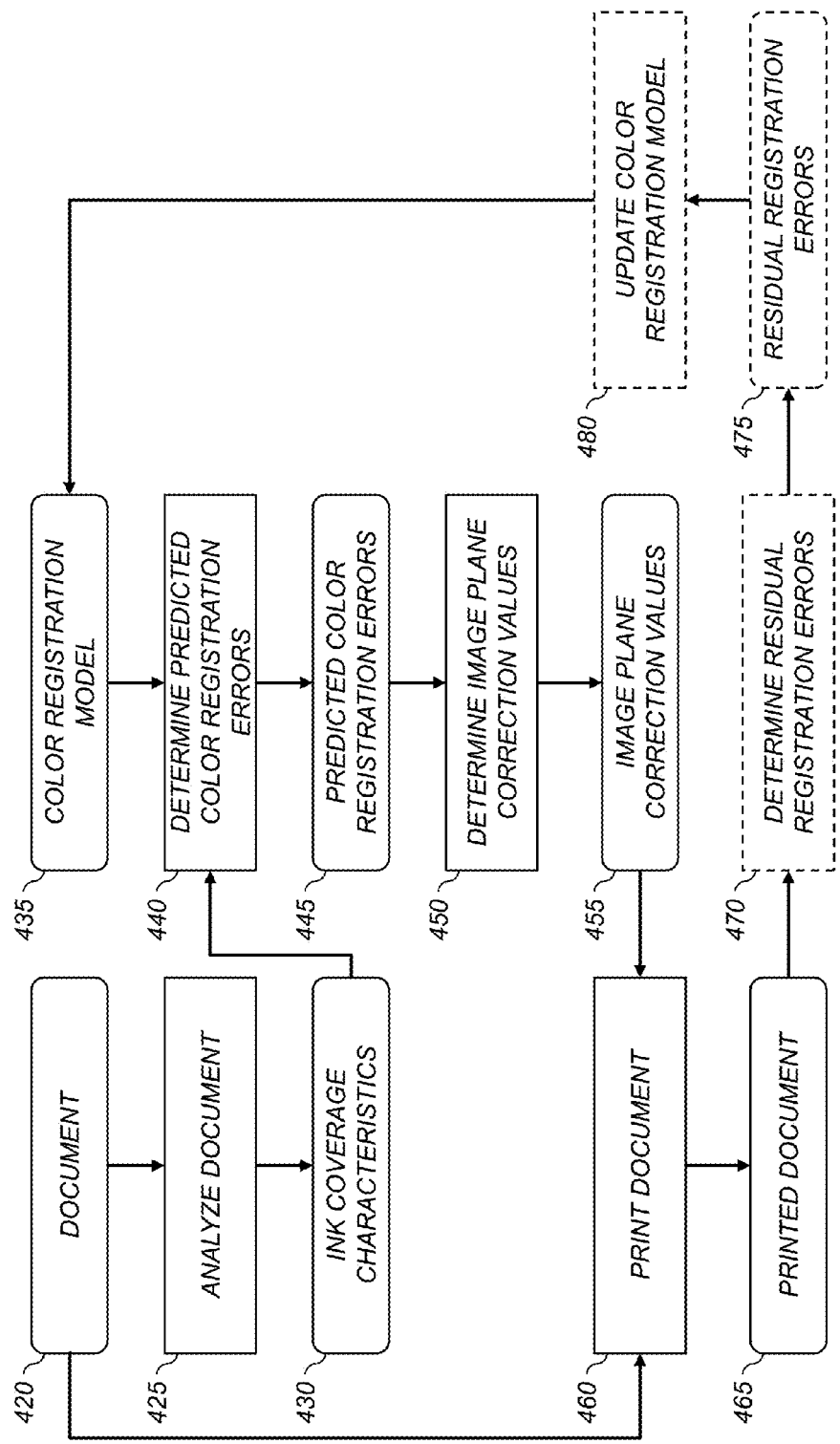
FIG. 7 is a flowchart illustrating a method for correction color registration errors in accordance with the present invention.

FIG. 7 shows a flowchart of an exemplary method for determining image plane correction values 455, such as registration correction parameters, appropriate for printing a document 420 using a digital printing system (such as the printing system 100 in FIG. 1) in accordance with an exemplary embodiment. In summary, this approach involves forming a color registration model 435 that predicts color registration errors as a function of ink coverage characteristics for a document 420. An analyze document step 425 is used to determine ink coverage characteristics for a particular document 420. A determine predicted color registration errors step 440 determines predicted color registration errors 445 using the color registration model 435. A determine image plane correction values step 450 is used to determine corresponding image plane correction values 455 for at least one color plane of the document 420. (Note that the term "color plane" is used generally within the context of the present invention, and can include image planes printed using any type of printable "ink," such as black, gray or colorless inks) A print document step 460 prints the document 420 using the image plane correction values 455, thereby forming a printed document 465.

The document 420 will generally be represented by an array of image pixels having pixel values which specify the ink coverage for a plurality of color planes. The analyze document step 425 analyzes the pixel values for each color plane to determine corresponding ink coverage characteristics 430. The ink coverage characteristics 430 can be determined and represented using any method known in the art. It is generally preferable the ink coverage characteristics be represented using a relatively small number of variables that summarize the distribution of ink within each color channel of the document 420.

In some embodiments, the ink coverage characteristics 430 can be determined by dividing the digital image data for the document 420 into a lattice of tiles and determining the average ink coverage within each tile for each color channel. For example, the document 420 can be broken into a 3×3 array of tiles, and the average code value (representing the average ink coverage) for each color channel can be computed as a measure of the ink coverage distribution for the document 420. In this example, if the document 420 has 4 color channels, the ink coverage characteristics 430 would be represented by 3×3×4=36 numbers.

In other embodiments, the ink coverage characteristics 430 can be represented in terms of a set of statistics determined by analyzing the document. For example, the statistics can include an average and a standard deviation of the ink coverage for each color channel across the entire document. The statistics can also include other quantities such as a centroid of the ink distribution. The statistics can also include various quantities that characterize the asymmetry of the ink coverage. For example, one statistic can be a difference between the average ink coverage for the left and right sides for each color channel of the document.

In some embodiments, the ink coverage characteristics 430 can be characterized by determining ink coverage profiles representing the distribution of ink across the width of the print medium 112. For example, FIG. 8A shows a portion of a web of print medium 112 that includes two documents. Document 420a includes a text region 414 having fairly low coverage and two object regions 416 containing objects such as pictures or graphs with much higher ink coverage that the text region 414. Document 420b also includes a text region 414 having fairly low ink coverage and two higher coverage object regions 416.

FIG. 8B shows an ink coverage plot 418a corresponding to a particular color channel for document 420a in FIG. 8A. The ink coverage plot 418a represents the distribution of ink in the cross-track direction 406 from one edge of the print medium 112 to the other, and is determined by averaging (or alternatively by integrating) the image data for document 402a in the in-track direction 404. The ink coverage plot 418a show two broad peaks produced by the heavy ink coverage of the two object regions 416. Similarly, FIG. 8C shows an ink coverage plot 418b determined in a similar fashion for document 420b. It can be seen that the locations of the peaks in the ink coverage plot 418b reflects the positions of the text region 414 and the object regions 416 in the document 420b.

It can be seen that the ink coverage plots 418a, 418b for the documents 420a, 420b are not symmetric around the centerline 422 of the print medium 112. As a result, the registration errors resulting from the deformation of the print medium 112 due to the ink coverage will also typically not be symmetric.

FIG. 9A shows two documents 420c and 420d in a print job. Corresponding ink coverage plots 418c, 418d are shown in FIGS. 9B and 9C, respectively. The ink coverages of the documents 420c, 420d in FIG. 9A are mirror symmetric to the ink coverages of the documents 420a, 420b in FIG. 8A. In general, the registration errors produced by the ink coverages of the FIG. 9A documents 420c, 420d will be mirror symmetric to the registration errors produced by the ink coverages of the documents 420a, 420b in FIG. 8A. The symmetric behavior of the registration errors can be exploited in various embodiments to reduce the amount of data that needs to be evaluated and stored.

The ink coverage profiles given by the ink coverage plots 418a, 418b, 418c, 418d can be used as relatively compact representations of the ink coverage characteristics 430 for a document 420. In some embodiments, the amount of data needed to represent the ink coverage characteristics 430 can be further reduced using various analysis techniques. For example, the x-axis of the ink coverage plots 418a, 418b, 418c, 418d can be divided into a series of bins (for example, between 4 and 20 bins), and the average value of the ink coverage within each bin can be computed. The average ink coverages within each bin can be used as a compact representation of the ink coverage characteristics 430.

In other embodiments, the ink coverage profile $F_j(x)$ for the $j^{th}$ color plane can be approximated by a series expansion based on a set of orthogonal basis functions $P_i(x)$.

$$F_j(x) \approx \sum_{i=0}^{n} c_{ij} P_i(x) \quad (1)$$

where x is the position across the width of the print medium 112 (FIG. 8A), and $c_{ij}$ is a coefficient used to scale the $i^{th}$ basis function for the $j^{th}$ color plane. In this example, the ink coverage profile $F_j(x)$ is approximated using (n+1) basis functions. An orthogonal set of basis functions is a set of functions in which any two basis functions $P_m(x)$ and $P_n(x)$ from the set are orthogonal to each other, that is:

$$\int P_m(x) P_n(x) d(x) = 0; \quad \text{for } m \neq n \quad (2)$$

Any appropriate set of basis functions known in the art can be used in accordance with the present invention, such as the well-known Fourier basis functions. In an exemplary embodiment, the set of basis functions is a set of Legendre polynomials that have been normalized such that for any order m:

$$\int_{-1}^{1} P_m^2(x) dx = 1 \quad (3)$$

The coefficients $c_{ij}$ for the basis functions in the series expansion can be determined by:

$$c_{ij} = \int_{-1}^{1} F_j(x) P_i(x) dx \quad (4)$$

A variety of numerical analysis algorithms are well-known in the art that can be used to evaluate these integrals.

Figure 10:
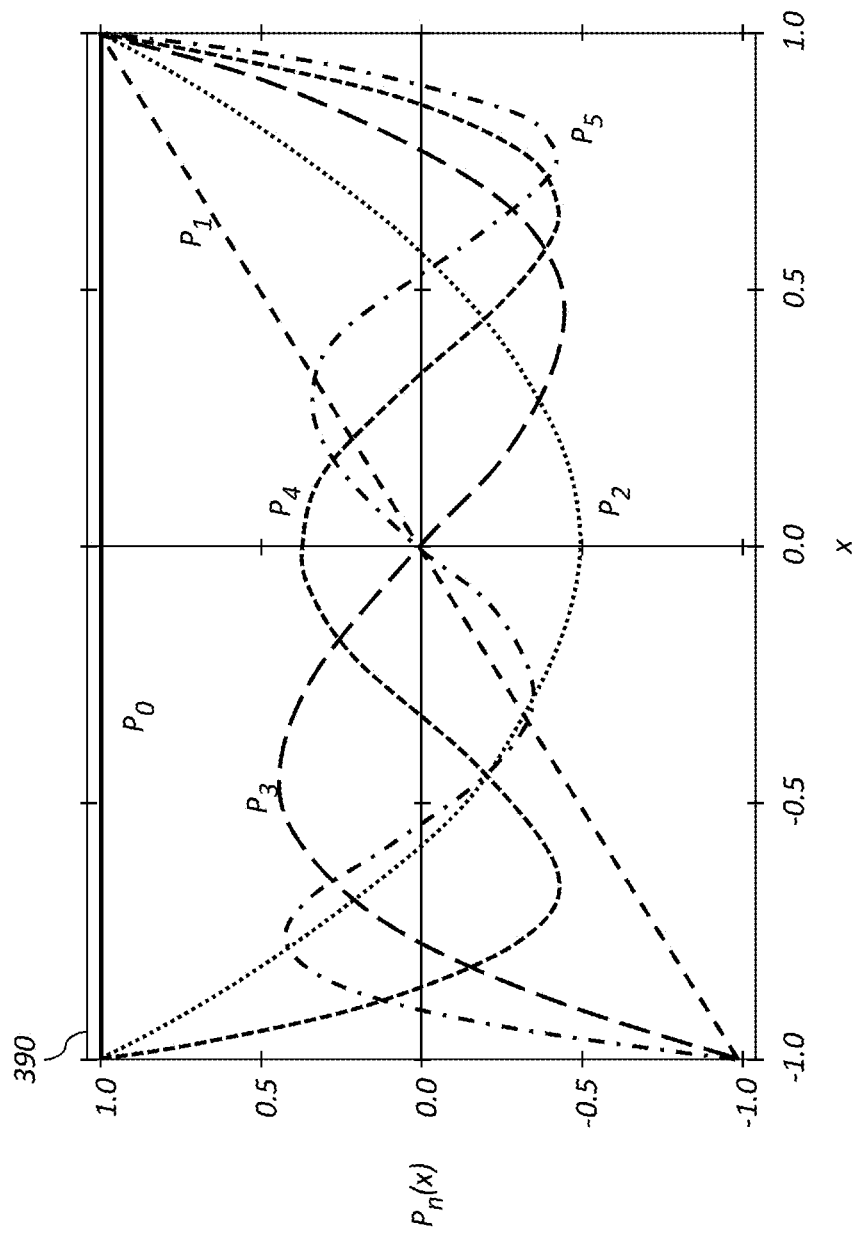
FIG. 10 illustrates the first several Legendre polynomials.

FIG. 10 shows a plot 390 of the first six Legendre polynomials $P_i(x)$ where i=0 to 5. As the Legendre polynomials are defined for x values ranging from −1 to 1, the cross-track position variable x, for a print medium width of w needs to be scaled to range from −1 to 1, with the centerline 422 (FIG. 9A) of the print medium 112 corresponding to x=0. The ink coverage level for each color plane are preferably scaled so that no applied ink corresponds to a coverage level of 0 and complete coverage corresponds to a coverage level of +1. Typically a tenth order series expansion or less is sufficient to adequately approximate the ink coverage characteristics 430 because the more closely spaced fluctuations in ink coverage of the higher order Legendre polynomials tend to have less of an effect on registration.

Returning to a discussion of FIG. 7, the color registration model 435 can take on a wide variety of forms in accordance with the present invention. In a preferred embodiment, the color registration model 435 is a parametric model having one or more parameters. The inputs to the parametric model can be the variables that summarize the ink coverage characteristics (e.g., the coefficients $c_{ij}$ of the Legendre polynomials determined for the document 420), and the outputs of the parametric model can be a set of variables that represent corresponding predicted color registration errors 445. The parameters of the parametric model can be determined by printing a plurality of test documents and measuring the resulting color registration errors (for example, using the quality control sensor 110 in FIG. 1). In some embodiments, a mathematical fitting process can then be used to determine the parameters for the parametric model that provide the best fit to the measured data.

In some embodiments, the set of test documents can be representative of a population of documents that are typically printed by the printing system 100 (FIG. 1). In other embodiments, the set of test documents can be chosen that have a wide range different ink coverage characteristics. For example, a set of documents can be designed where each document has ink coverage characteristics 430 corresponding to one of the members of the set of basis functions $P_i(x)$ (with an appropriate amount of the uniform zero-order Legendre polynomial added to keep the ink coverage levels of the document from being negative). This enables the registration errors associated with each of the basis functions to be independently characterized. In some embodiments, the set of test documents can be designed to include documents having characteristics that are likely to produce registration errors of one or more of the registration error types which shown in FIGS. 4-6.

The printing of the set of test documents that are used to determine the color registration model 435 can be performed during a system calibration process. The system calibration process can be performed during an initial system configuration process (e.g., at the factory or when the printer is installed), or on an as-needed basis. For example, the system calibration process can be initiated when an operator observes significant color registration errors, or when a new print medium is installed in the printing system 100 (FIG. 1). In some embodiments, the system calibration process can be performed at regular intervals, for example at the start of each shift.

In an exemplary embodiment, the color registration model 435 can be a simple linear model of the form:

$$E = a_0 + \sum_{n=1}^{N} a_n C_n \quad (5)$$

where N different variables $C_n$ are used to characterize the ink coverage characteristics 430 for the document 420 (e.g., the coefficients $c_{ij}$ of the Legendre polynomials determined for the ink coverage profiles $F_j(x)$), E is a vector of predicted color registration errors 445, and $a_n$ is a vector of weighting coefficients determined from the measured registration errors for a set of test documents using a fitting process. In the case where the variables $C_n$ are the coefficients for a set of basis functions, the weighting coefficient $a_n$ would effectively correspond to the amount of color registration errors that would result from a document 420 having image content including a unit amount of the corresponding basis function. In other embodiments, the color registration model 435 can take different forms besides the simple linear model given in Eq. (5). For example, the model can include terms for higher-order polynomial functions such as higher-power terms (e.g., $C_n^2$) or cross-terms (e.g., $C_1 C_2$). Alternately, the color registration model 435 can use any other functional form known in the art that is found to predict the color registration errors with adequate accuracy.

In an exemplary embodiment, the vector E of predicted color registration errors 445 includes a set of K different variables $E_k$ which characterize different aspects of the color registration errors. For example, the registration error variables $E_k$ can include color plane translation values in the cross-track and in-track directions (i.e., $\Delta x$, $\Delta y$) for each color plane to characterize the translation errors illustrated in FIG. 4. The registration error variables $E_k$ can also include color plane magnification values in the cross-track and in-track directions (i.e., $M_x$, $M_y$) for each color plane to characterize the stretch/contraction errors illustrated in FIG. 5 and color plane rotation values ($\theta$) for each color plane to characterize the rotation errors illustrated in FIG. 6. Other types of registration error variables $E_k$ can include image plane skew parameters. Preferably, the registration error variables are specified in such a way that they are independent of each other. The registration errors as a function of position within the document 420 can then be estimated by combining the effects of each of the different registration error components.

The above examples of registration error variables are global in nature in that they specify registration errors across the entire document 420. In some embodiments, more complex color registration error functions can be used to characterize registration errors which may vary from one local region to another. For example, the registration error variables $E_k$ can specify the registration errors in terms of translations for a lattice of positions within the document 420. The registration errors for intermediate positions can then be estimated by using an interpolation process. This approach can be useful for cases where the image content in one portion of the image causes the print medium 112 to swell in a local region without affecting other portions of the print medium 112 which received a lower ink load.

In some embodiments, the predicted color registration errors 445 for each color plane can be specified with respect to an absolute position on the print medium 112. In other embodiments, one of the color planes (e.g., the first color plane that is printed) can be specified to be a reference color plane, and the registration errors for the other color planes can specify position differences relative to the reference color plane.

The color registration errors that are produced for a particular document 420 will generally be dependent on the configuration of the printing system 100. For example, the color registration errors can vary significantly depending on the characteristics of the print medium 112. For example, a lighter weight print medium will be more susceptible to distortions, and therefore to registration errors, than a heavier weight print medium. The color registration errors can also be affected by other factors such as ink formulation and printer operating conditions (e.g., printing speed, dryer settings and environmental conditions). In some embodiments, different color registration models 435 are predetermined for a series of different types of print media 112, or different combinations of other factors. When a print job is received, an operator can identify the appropriate type of print medium 112 and other system configuration factors, and an appropriate color registration model 435 can then be selected accordingly.

In some embodiments, one or more system configuration parameters can be used as inputs to the color registration model 435. For example, the weight of the print medium 112 as an additional input to the color registration model 435 rather than providing a plurality of different color registration models 435.

The determine predicted color registration errors step 440 is used to determine the predicted color registration errors 445 for a particular document 420 by using the ink coverage characteristics 430 as inputs to the color registration model 435. Once the predicted color registration errors 445 are determined, a determine image plane correction values step 450 is used to determine a set of corresponding image plane correction values 455 that are appropriate to compensate for the predicted color registration errors 445. Print document step 460 is then used to print the document 420 using the image plane correction values 455.

The determine image plane correction values step 450 can determine the image plane correction values 455 using any method known in the art. For example, if the predicted color registration errors 445 include in-track and cross-track color plane translation values for a particular color plane (i.e., $\Delta x$, $\Delta y$), the image plane correction values 455 can include corresponding in-track and cross-track color plane shifts in the opposite direction (i.e., $\Delta x_c = -\Delta x$, $\Delta y_c = -\Delta y$). Similarly, if the predicted color registration errors 445 include color plane magnification values in the in-track and cross-track directions (i.e., $M_x$, $M_y$), the image plane correction values 455 can include compensating in-track and cross-track color magnification factors (i.e., $M_{xc} = 1/M_x$, $M_{yc} = 1/M_y$). Likewise, if the predicted color registration errors 445 include color plane rotation values ($\theta$), the image plane correction values 455 can include compensating rotations (i.e., $\theta_c = -\theta$). If the predicted color registration errors 445 include more complex functions that describe the registration errors as a function of location within the document 420, the image plane correction values 455 can include parameters describing corresponding correction functions that compensate for the complex registration errors.

The print document step 460 can apply the image plane correction values 455 to the document 420 in a variety of different ways. In some embodiments, digital image data for each color plane of the document 420 can be modified to incorporate the desired image plane corrections (e.g., in-track and cross-track color plane shifts, in-track and cross-track color plane magnification adjustments, and color plane rotations or skew adjustments). The modified digital image data can then be printed normally. In other embodiments, some or all of the image plane corrections can be applied by adjusting the image data as it is being printed, or by adjusting the printing process.

In some embodiments, the image plane correction values 455 can be used to control a web-transport system that moves the continuous web of print medium 112 through the printing system 100. For example, the web-transport system can be controlled to steer the print medium 112, or adjust the speed that the print medium 112 moves through the printing system 100. For example, the print medium 112 can be steered using the media transport system described in commonly-assigned, co-pending U.S. Patent Application Publication 2013/0113857 to Armbruster et al., entitled "Media transport system including active media steering," which is incorporated herein by reference. This approach uses structures such as steered caster rollers to steer the web of media. In other embodiments, the print medium 112 can be steered using the media transport system described in commonly-assigned, co-pending U.S. patent application Ser. No. 14/190,125, to Muir et al., entitled "media guiding system using Bernoulli force roller," which is incorporated herein by reference. This approach uses one or more media-guiding rollers having grooves formed around the exterior surface. An air source is controlled to provide an air flow into the grooves, thereby producing a Bernoulli force to draw the web of media into contact with the media-guiding rollers. An axis of the media-guiding rollers can be positioned to steer the web of media, or to perform other functions such providing a stretching force in the cross-track direction to prevent the formation of wrinkles.

In some embodiments, in-track color plane shifts can be applied by adjusting the timing at which lines of image data are printed using the printheads 200 (FIG. 2). For example, to shift the image forward along the print medium 112, the lines of image data can be printed at a slightly earlier time than they would be nominally, and to shift the image backward along the print medium 112, the lines of image data can be printed at a slightly later time than they would be nominally.

In some embodiments, cross-track color plane shifts can be applied by adjusting which inkjet nozzles are used to print the image data. For example, the image data supplied to the printheads can be shifted left or right to use different subsets of the nozzles in the printheads 200. In other embodiments, a servo-system can be used to adjust a cross-track position of the print medium 112 to apply the cross-track color plane shifts.

In some embodiments, cross-track magnification changes can be applied out using the methods described in commonly assigned, co-pending U.S. patent application Ser. No. 13/599,067, entitled: "Aligning print data using matching pixel patterns", by Enge et al.; and commonly assigned, co-pending U.S. patent application Ser. No. 13/599,129, entitled: "Modifying image data using matching pixel patterns", by Enge et al., each of which is incorporated herein by reference. This method involves inserting or deleting image pixels across the width of the printhead 200 to adjust the size of the printed image in the cross-track direction 406.

In some embodiments, in-track magnification changes can be applied by adjusting the timing at which lines of image data are printed by the printheads 200. For example, to increase the in-track image size, the timing between the printing of successive lines of image data can be increased slightly, and to decrease the in-track image size, the timing between the printing of successive lines of image data can be decreased slightly.

An optional determine residual registration errors step 470 can be used to analyze the printed document 465 to determine residual registration errors 475. This enables the system to monitor whether the determined image plane correction values 455 provided accurate compensation for the color registration errors. In some embodiments, the determine residual registration errors step 470 uses the quality control sensor 110 (FIG. 1) to evaluate the positions of alignment marks printed in the margin of the document 420. In other embodiments, the printed image data in the printed document 465 can be analyzed as described in commonly-assigned, co-pending U.S. patent application Ser. No. 14/061,833 to J. Howard et al., entitled "Printer with image plane alignment correction," which is incorporated herein by reference.

In some embodiments, the color registration of subsequently printed images can be adjusted accordingly if it is determined that the residual registration errors 475 are significant and consistent. In some embodiments, an update color registration model step 480 can be used to update the color registration model 435 based on the ink coverage characteristics 430 and the corresponding residual registration errors 475 associated with the document 420. For example, the set of test documents that are used to determine the parameters of the color registration model 435 can be updated to include the document 420, and an updated set of parameters can be determined.

The distortions in the print medium 112 that result from printing a particular document can impact the registration errors for documents both upstream and downstream of the document. For example, if an asymmetric ink coverage in a document causes the print medium 112 to shift laterally, some or all of the lateral shift may still be present when the next document in the print job is printed. It can therefore be advantageous to generalize the methods described earlier with respect to FIG. 7 to account for this effect.

Figure 11:
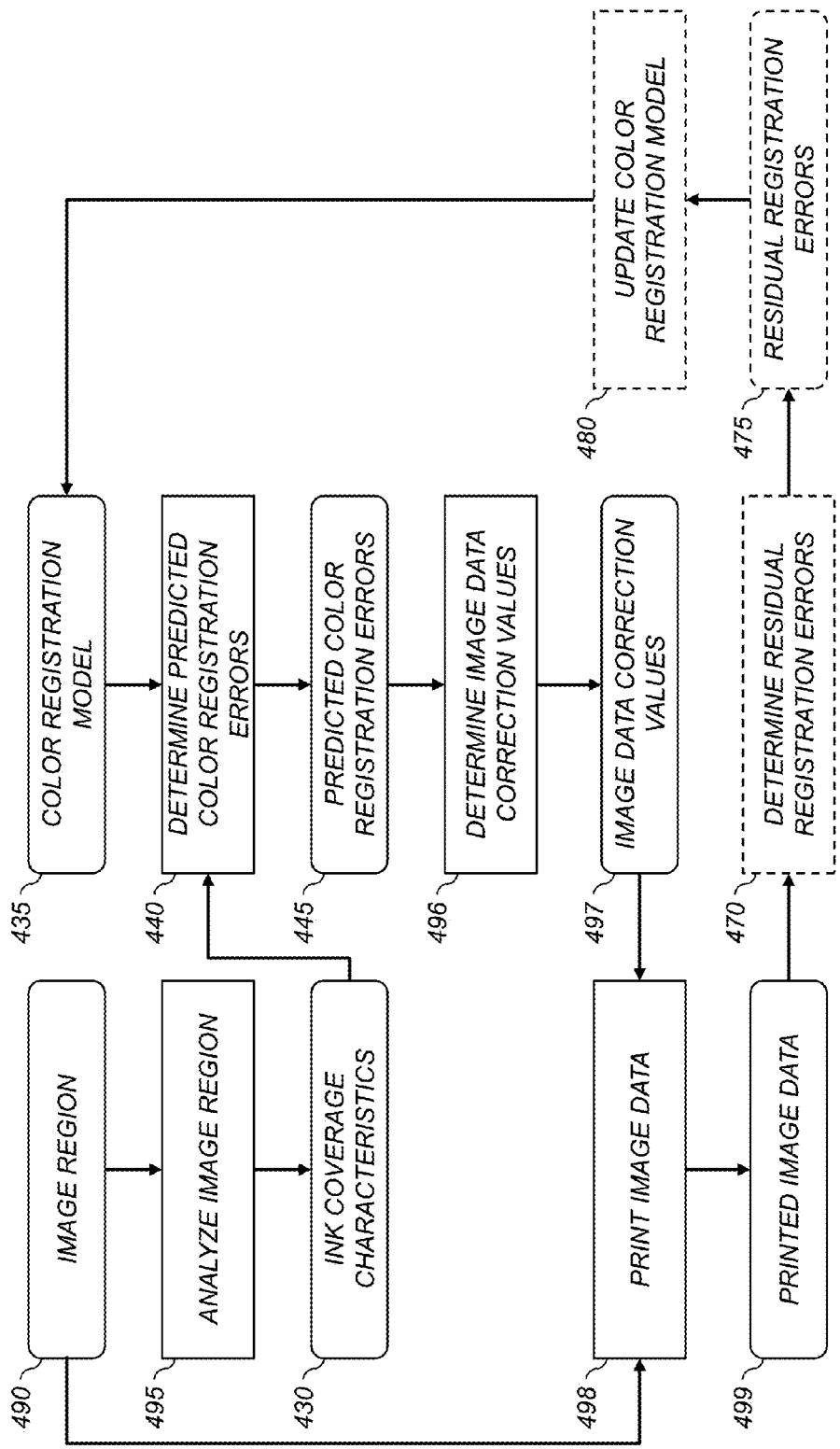
FIG. 11 is a flowchart illustrating a method for correction color registration errors in accordance with an alternate embodiment.
Figure 12:
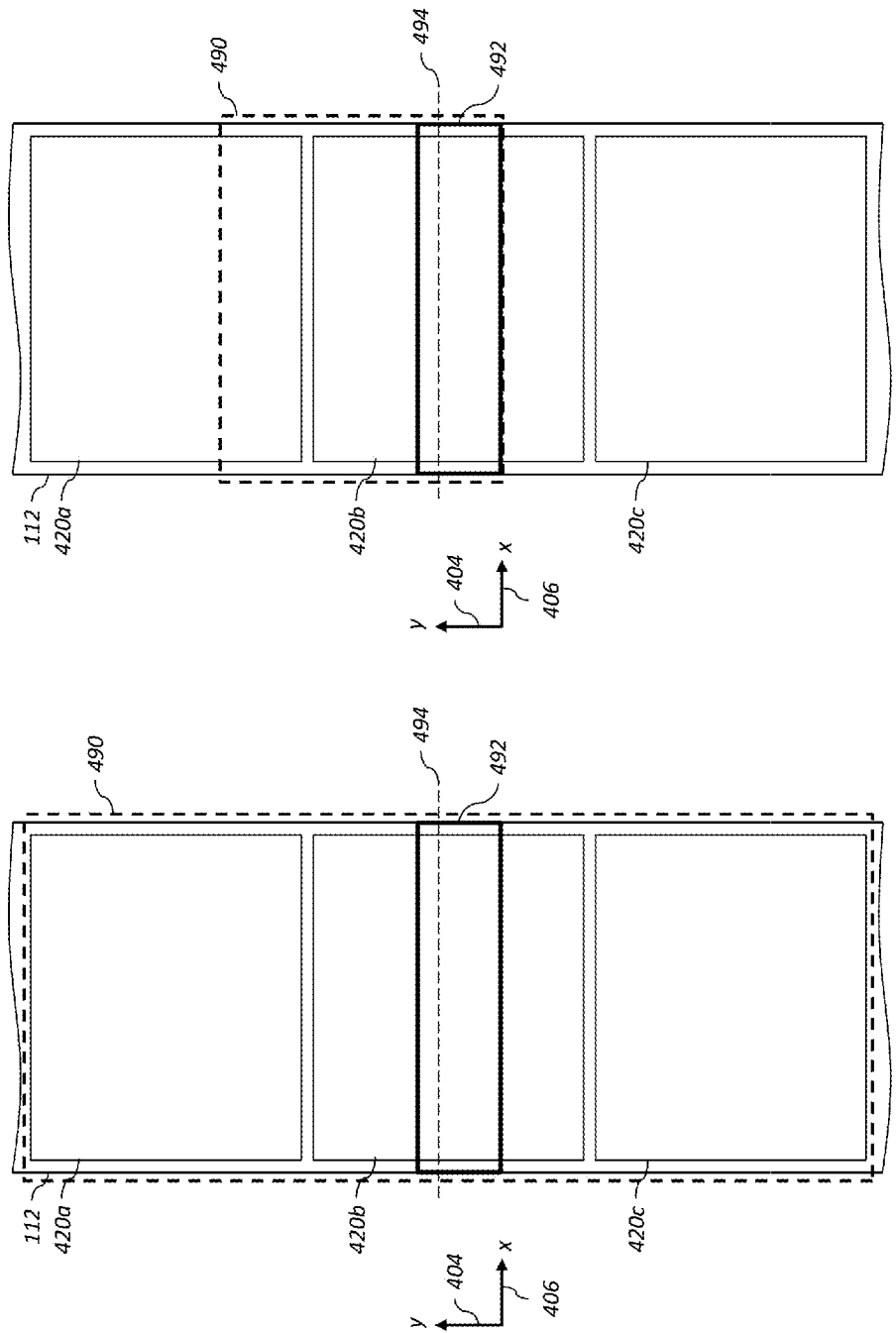
FIGS. 12A and 12B illustrate exemplary image regions for use with the method of FIG. 11.

FIG. 11 shows a flowchart of a method for correcting color registration errors at a particular in-track position which represents a variation of the approach shown in FIG. 7. In this example, an image region 490, which can be of any size is analyzed by an analyze image region step 495 to determine corresponding ink coverage characteristics. In some exemplary embodiments, the image region 490 can include a plurality of individual documents. For example, FIG. 12A shows a portion of a web of print medium 112 which includes three documents 420a, 420b, 420c. In accordance with the method of FIG. 11, it is desired to correct for color registration errors at a particular in-track position 494. An image region 490 can be defined, which in this example includes the document 420b including the in-track position 494, together with the documents 420a and 420c which are positioned downstream and upstream of document 420b, respectively. Downstream document 420a includes previously printed image data, and upstream document 420c includes yet-to-be printed image data. In other embodiments, the image region 490 will only include previously-printed image data. (Note that upstream portions of the print medium 112 may include previously-printed image data from printheads 200 that are located upstream of the current printhead 200.) In some embodiments, the length of the image region 490 is approximately equal to the length of the print zone from the first linehead 106-1 through the last linehead 106-4 within a print module 102 or 104 in FIG. 1. For a particular linehead 106-1, 106-2, 106-3, 106-4, the relative length of the portion of the image region 490 upstream of the in-track position 494 to the portion of the image region 490 downstream of the in-track position 494 can vary depending on the position of the linehead 106-1, 106-2, 106-3, 106-4 within the print zone. In other cases, the image region 490 can include only a portion of document 420b, or can include portions of a plurality of documents (for example, the downstream portion of document 420b and the second half of downstream document 420a as illustrated in FIG. 12B.

Returning to a discussion of FIG. 11, the ink coverage characteristics 430 determined for the image region 490 are used to determine predicted color registration errors 445 using a method analogous to that described earlier with respect to FIG. 7. The only difference being that the color registration model 435 is adapted to predict the color registration errors at a particular in-track position 494 as a function of the ink coverage characteristics 430 for the larger image region 490. In some embodiments, the image region 490 is divided into a series of sub-regions, and the inputs to the color registration model can be a set of variables $C_n$ determined for each sub-region using methods such as those described earlier. For example, in the example, of FIG. 12A, the sub-regions can be the areas corresponding to the three documents 420a, 420b, 420c and a set of variables $C_n$ is determined for each of the documents 420a, 420b, 420c.

A determine image data correction values step 496 is used to determine image data correction values 497 responsive to the predicted color registration errors 445. In a preferred embodiment, the image data correction values 497 are used to correct the color registration errors for a set of in-track positions 492 (FIG. 12A) that includes the current in-track position 494. In some embodiments, the set of in-track positions 492 can include the entire document 420b. In other embodiments, the set of in-track positions 492 can include only a single image line, or a small set of image lines including the in-track position 494.

In some embodiments, image data correction values 497 are determined at a series of in-track positions 494 which are spaced apart along the in-track direction 404, and an interpolation process is used to determine image data correction values 497 to be applied for intermediate positions to provide smooth transitions in the corrected image.

A print image data step 498 is used to print the image data for the set of in-track positions 492 (FIG. 12A) using the image data correction values 497, thereby providing printed image data 499. To print the image data for the next set of in-track positions, the process is repeated using a new image region 490 which contains the next set of in-track positions. The remaining steps in FIG. 11 are analogous to the corresponding steps in FIG. 7, which were discussed earlier.

Figure 13:
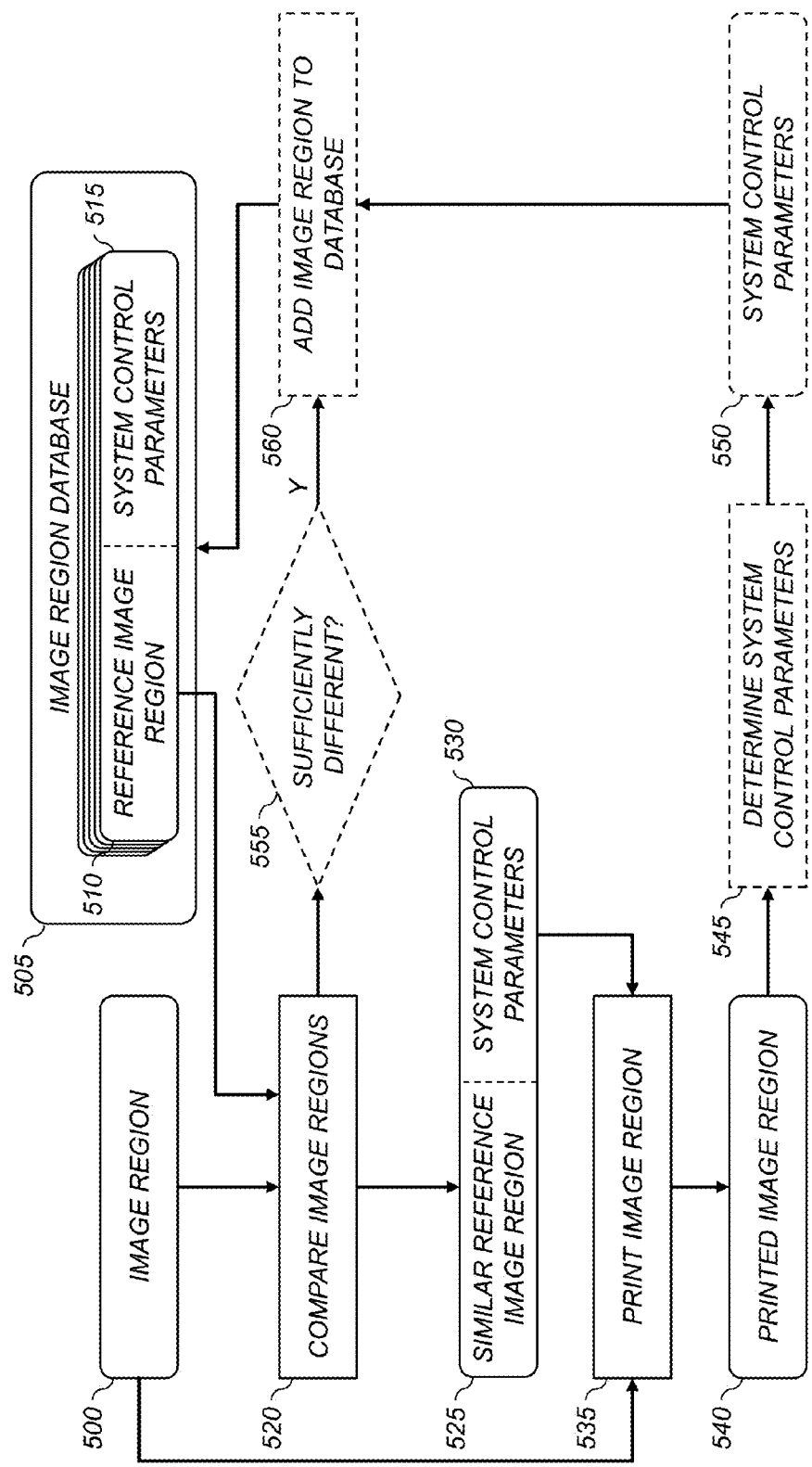
FIG. 13 is a flowchart illustrating a method for determining system control parameters for a printing system using an image region database.

FIG. 13 shows a flowchart of a method for determining various system control parameters 530, such as registration correction parameters, appropriate for printing an image region 500 using a digital printing system (such as the printing system 100 in FIG. 1) in accordance with an alternate embodiment. In summary, this approach involves forming an image region database 505 including a library of reference image regions 510 for which appropriate system control parameters 515 (e.g., registration corrections) have been previously determined. When a new print job is being printed, the controller analyzes each image region 500 within the print job to find a similar reference image region 525. In print image region step 535, the controller then prints the image region 500 using system control parameters 530 associated with the similar reference image region 525.

In some embodiments, the image region 500 can be a "document" such as the documents $D_1$, $D_2$, $D_3$, $D_N$ in FIG. 3. In other embodiments, the image region 500 can correspond to a portion of a document, or to an image area of a fixed length in the in-track direction 404, spanning the width of the print medium 112 in the cross-track direction 406, such as the image region 490 in FIG. 12B. In some embodiments, the method can be applied to printers that print on individual sheets of print medium 112. In this case, it can be appropriate for the image regions 500 to correspond to a single sheet of print medium 112.

In some embodiments, the image region 500 can include at least a portion of a plurality of individual document pages that are proximal to a current page since the proximal pages can affect the registration errors of the current page. For example, the proximal pages can include one or more downstream pages that have been printed before the current page is printed. The proximal pages can also include one or more upstream pages, such as pages where at least one color channel has been printed before the current color channel of the current page is printed.

Image region database 505 stores data characterizing a plurality of reference image regions 510. Each reference image region 510 has one or more associated system control parameters 515 that have been previously determined to be appropriate for use in printing the reference image region 510 with the printing system 100.

The image region database 505 is stored in a memory which is accessible by the processor used to perform relevant steps in the method of FIG. 13. In some embodiments, the method is performed using a processing system 118 which is a component of the printing system 100. In this case, the image region database 505 is preferably stored in storage system 120 associated with the processing system 118 (FIG. 1). In other embodiments, the analysis steps, such as compare image regions step 520, are performed using a processing system at a different location from the printing system 100. For example, the print job can be ripped and prepared for printing at a remote location, and the ripped print job can be transmitted to the printing system 100 over a network. As will be well-known to those skilled in the art, the term "ripped" refers to using a Raster Image Processor (RIP) to process an input image to determine image data appropriate for printing. The process of "ripping" the image data can include various operations such as color processing, rasterization, resizing and halftoning. For cases where the ripping occurs at a remote location, the processing system 118 used to perform the analysis steps in FIG. 13 can also be located at the remote location, and the determined system control parameters 530 can be transmitted to the printing system 100 together with the ripped print job. Accordingly, the processor-accessible memory used to store the image region database 505 can also be located at the remote location.

In a preferred embodiment, the system control parameters 515 include registration correction parameters that can be used to correct for registration errors that have been determined to be characteristic of the associated reference image region 510. The registration correction parameters are used to control various aspects of the printing process in order to control the registration between two or more different color channels. As was discussed earlier with respect to the image plane correction values 455 in FIG. 7, registration correction parameters can include in-track and cross-track color plane shifts, in-track and cross-track color plane magnification adjustments, and color plane rotations or skew adjustments.

The system control parameters 515 can also include other types of parameters that can be used to control the printing system in accordance with the characteristics of the image region 500. In some embodiments, the system control parameters 515 can include a dryer control parameter that controls a setting on the dryer 108 (FIG. 1). For example, the dryer control parameter can control the amount of heat or airflow provided by the dryer depending on the amount of ink printed in the image region 500.

The system control parameters 515 can also include a color adjustment parameter that is used to adjust color reproduction characteristics of the image region 500. In some embodiments, the color reproduction characteristics are adjusted by adjusting a color transformation applied to the image data of the image region 500. Depending on the type of printer, the color reproduction characteristics can also be controlled by adjusting appropriate printing system parameters. For example, in an electrophotographic printing system the color reproduction can be controlled by adjusting an exposure level used to expose the photoconductor or a development voltage used in the toner development process.

In some embodiments, the printing system 100 is capable of printing images using a plurality of different print modes. In this case, the system control parameters 515 can also include a print mode parameter that is used to select a print mode that should be used to print the image region 500. For example, the print mode can be a color print mode, or a black and white print mode. The print-mode can also include specifying various attributes such as a printing resolution, a print speed, or a halftoning algorithm to be used to process the image data. Depending on the printing technology the print mode parameter can be used to specify various printing attributes such as selecting a number of printing passes (e.g., for a desktop inkjet printer), or a bias voltage setting (e.g., for an electrophotographic printer).

In some embodiments, the printer may include a de-curling subsystem for reducing curl in the print medium. An exemplary de-curling subsystem is disclosed in U.S. Pat. No. 5,084,731 to Baruch, entitled "Sheet decurling mechanism and method," which is incorporated herein by reference. In this case, the system control parameters 515 can include a setting on the de-curling subsystem. For example, image regions 500 that require larger amounts of ink will typically be more susceptible to curl. Therefore, it can be advantageous to make corresponding adjustments to the de-curling subsystem, such as adjustments to an amount of force applied at de-curling nip rollers, to compensate for the larger curl levels.

The set of reference image regions 510 can be selected in a variety of different ways in accordance with the present invention. In some embodiments, the reference image regions 510 in the image region database 505 are selected to be representative of different types of image regions 500 that are commonly printed by the printing system 100. The selection of the representative reference image regions 510 can be manually done by a user based on knowledge of the typical document types printed using a particular printing system 100. Alternately, the selection of the representative reference image regions 510 can be done automatically by analyzing a population of print jobs that are printed by the printing system 100. The population of print jobs can be generic to a particular type of printer, or can be tailored to the print jobs printed by a particular customer. In some embodiments, new reference image regions 510 can be added to the image region database 505 during the operation of the printing system 100. For example, if an image region 500 is printed that is sufficiently different from any of the reference image regions 510 in the image region database 505, a new entry can be added to the image region database 505.

In some embodiments, the data characterizing the reference image regions 510 can be digital image data including an array of image pixels, each image pixel having a pixel value. To facilitate both the analysis of the image regions 500, and the storage of information in the image region database 505, the digital image data should be stored at a spatial resolution sufficient for analysis. However, this spatial resolution can be different from the spatial resolution required for printing the documents. In a preferred embodiment, the spatial resolution of the image region 500 and the reference image regions 510 used for analysis by the compare image regions step 520 can be much lower than the spatial resolution required for printing the documents.

In some embodiments, the documents that have been ripped for printing are resized to a lower spatial resolution to provide the image regions 500 required for analysis. The reference image regions 510 are preferably stored at the same spatial resolution for easy comparison with the image regions 500. In other embodiments, the input image can be ripped a first time to obtain the image data for printing, and can be ripped a second time to a lower spatial resolution to obtain the image data needed for analysis. For example, the documents can be ripped at a low spatial resolution (e.g., 5-10 pixels/inch) for analysis purposes, whereas the documents need to be ripped to 600 pixels/inch or higher for printing. Ripping the documents at a lower spatial resolution requires less time than is required for ripping them at higher spatial resolutions for printing. At spatial resolutions of 5-10 pixels/inch, the image data has sufficient resolution to identify ink coverage patterns that can lead to issues such as color-to-color registration errors.

Using image regions 500 having a lower spatial resolution, and storing the reference image regions 510 at the lower spatial resolution, has a number of advantages. First, storing the reference image regions 510 at the lower spatial resolution requires less storage space for the image region database 505. Additionally, the analysis of the image region 500 can be faster since a smaller amount of image data must be analyzed. A further benefit of storing the reference image regions 510 at a lower spatial resolution is that this tends to remove any image content that may be considered confidential. This enables storing the reference image regions 510 without risking the confidentiality of the document content.

In other embodiments, the data characterizing the reference image regions 510 can be parametric representations of the reference image regions 510. For example, the parametric representations can be ink coverage profiles such as the ink coverage plots 418a in FIG. 8B, or any of the other representations of the ink coverage characteristics 430 that were discussed relative to the method of FIG. 7. For example, the data characterizing the reference image regions 510 can be a set of N different variables $C_n$ that are used to characterize the ink coverage of the reference image regions 510. In an exemplary embodiment, the variables $C_n$ used to characterize the reference image regions 510 are coefficients $c_{ij}$ of Legendre polynomials that are determined for ink coverage profiles $F_j(x)$ determined for each color channel of the reference image region 510 as described earlier with respect to Eq. (4). Preferably, the image region 500 is processed in an equivalent manner as the reference image regions 510 to determine corresponding data characterizing the image region 500.

Compare image regions step 520 compares the image region 500 to the reference image regions 510 to identify a similar reference image region 525. In an exemplary embodiment, a difference metric is computed between the image region 500 and each of the reference image regions 510, and the reference image region 510 having the smallest difference metric is designated to be the similar reference image region 525.

If the data characterizing the image region 500 and the reference image regions 510 are image data including an array of image pixels, the difference metric can be computed by determining a difference image $d_i(x,y)$:

$$d_i(x, y) = |I(x, y) - R_i(x, y)| \qquad (6)$$

where $I(x,y)$ is the image data for the image region 500 and $R_i(x,y)$ is the image data for the $i^{th}$ reference image regions 510. Statistical analysis can then be applied to the difference image $d_i(x,y)$ to determine the difference metric. In some embodiment, the difference metric can be determined by computing the mean of the pixel values in the difference image $d_i(x,y)$:

$$D_i = \frac{1}{N_x N_y} \sum_{x=1}^{N_x} \sum_{y=1}^{N_y} d_i(x, y) \qquad (7)$$

where $D_i$ is the difference metric for the $i^{th}$ reference image region 510, and the size of the $i^{th}$ difference image $d_i(x,y)$ is $N_x \times N_y$. In other embodiments, the difference metric can take other forms such as the median of the pixel values, or RMS pixel value.

If the data characterizing the image region 500 and the reference image regions 510 are a set of variables $C_n$ that are used to characterize the ink coverage, the difference metric can be computed by computing differences between the set of variables for the image region 500 ($C_{n,I}$) and the set variables for the $i^{th}$ reference image region 510 ($C_{n,i}$). In an exemplary embodiment, the difference metric $D_i$ for the $i^{th}$ reference image region 510 can be determined using the following equation:

$$D_i = \sum_{n=1}^{N} w_n |C_{n,I} - C_{n,i}|^2 \quad (8)$$

where N is the number of variables, and $w_n$ is a weighting coefficient for the $n^{th}$ variable which can be used to adjust the relative importance of the set of variables.

The weighting coefficients $w_n$ can be determined empirically, or by analyzing a set of training image regions 500 where optimal system control parameters have been predetermined. In this case, the weighting coefficients can be optimized to maximize the probability the reference image region 510 having the associated system control parameters 515 which are closest to the optimal system control parameters is selected by the compare image regions step 520. For example, if the variables $C_n$ are coefficients $c_{ij}$ of Legendre polynomials, then the higher-order polynomials will generally be associated with finer detail features of the ink coverage profile. Therefore, the variables associated with the higher-order polynomials will generally make a smaller contribution to the prediction of color registration corrections than the variables associated with lower-order polynomials. Consequently, the weighting factors for the variables associated with the higher-order polynomials can typically be smaller than for the variables associated with the lower-order polynomials.

In some embodiments, the image region 500 can be compared with both the reference image regions 510, as well as mirror images of the reference image regions. This can effectively increase the number of reference image regions 510 stored in the image region database 505 without requiring an increase in the associated storage memory. For cases where the stored data characterizing the reference image regions are coefficients $c_{ij}$ of Legendre polynomials, then the mirror image of the reference image region can be conveniently determined by noting that all of the even orders of the Legendre polynomials are symmetric about the centerline, while all the odd orders are anti-symmetric about the centerline. Therefore, the Legendre polynomial series expansion of a mirror image ink coverage profile, will have the same coefficients for the even orders of the expansion and while the odd orders will differ by a change in sign, that is $c'_{ij}=(-1)^i c_{ij}$. Therefore, the image region 500 can be compared by the mirror image of a reference image region 510 by simply applying this modification to the Legendre polynomial coefficients. If one of the mirror image reference image regions is found to be the similar reference image region 525, then the system control parameters can be adjusted accordingly to account for the fact that the registration errors will also generally be reversed. However, some types of print media 112 may not exhibit the typical mirror symmetry response. Therefore it can be desirable to provide the operator with the option of disabling the mirror symmetry comparison of the image region 500 to the reference image regions 510.

In some embodiments, the image region 500 can also be compared with scaled versions of reference image regions 510. If a scaled reference image region is found to be the best match to the image region 500, then the associated system control parameters 530 can be adjusted accordingly. In some cases, it can be assumed that the registration errors will be proportional to the amount of ink applied to the print medium 112. In this case, it can be assumed that the registration corrections can be scaled according to the scale factor used to scale the reference image region 510. In other cases, the registration corrections can be scaled using a scale factor which is a function of the scale factor used to scale the reference image region 510.

In some embodiments, one or more system configuration parameters are associated with the image region 500 and the reference image regions 510. Examples of system configuration parameters can include print media type, print media size, print speed or print mode. In some embodiments, the compare image regions step 520 compares the system configuration parameters associated with the image region 500 to the system configuration parameters associated with the reference image regions 510, and only considers reference image regions 510 having associated system configuration parameters that are sufficiently similar to those associated with the image region 500. For example, since performance attributes such as registration errors will typically depend on the print media type, it can be appropriate to limit the reference image regions that are considered to those having associated system control parameters 515 that were determined for similar print media types (e.g., having a similar media weight and composition). In some cases, a plurality of sets of system control parameters 515 can be associated with a particular reference image region 510, each one associated with a different set of system configuration parameters. In some cases, the system configuration parameters can be included in the computation of the difference metric used to compare the image region 500 to the reference image regions 510.

In some embodiments, different image region databases 505 can be provided for different system configurations. For example, different image region databases 505 can be provided for different print media types or different print speeds. Before printing a print job, an operator can configure the printer for the print job, and an image region database 505 can be automatically or manually selected which is consistent with the selected system configuration. In some embodiments, a single image region database 505 can be used which includes a single set of reference image regions 510, but includes multiple sets of system control parameters 515 corresponding to different system configurations. This can have the same effect as defining a plurality of image region databases 505, but will require less storage memory.

Print image region step 535 is then used to print the image region 500 responsive to the system control parameters 530 associated with the selected similar reference image region 525. In some embodiments, the print image region step 535 prints the entire image region 500 using the system control parameters 530. In other embodiments, only a subset of the image region 500 is printed using the system control parameters 530. For example, in some embodiments, system control parameters 530 are determined for a sequence of image regions 500 to be printed on a web of print medium 112. In this case, the selected system control parameters 530 can be applied for a line of image data in the center of each image region 500, and interpolation can be used to smoothly transition the system control parameters from one image region 500 to the next.

As was discussed earlier, the system control parameters 530 can include registration correction parameters such as in-track and cross-track color plane shifts, in-track and cross-track color plane magnification adjustments, and color plane rotations or skew adjustments. As was discussed earlier with respect to FIG. 7, these parameters can be used to modify the image data for the image region, or to control various aspects of the printing system, such as media-steering components or timing components. The print image region step 535 in FIG. 13 can apply the registration correction parameters using any of the methods that were discussed earlier with respect to the print document step 460 in FIG. 7 and the print image data step 498 in FIG. 11.

The performance of the printing system 100 can be monitored (for example, using the quality control sensor 110) to detect performance degradations such as registration errors. In some embodiments, any such degradations that are detected can be used to update the image region database 505. For example, if it is observed that the registration errors which result when image regions 500 are printed using the system control parameters 515 associated with a particular reference image region 510 have a systematic bias, then the associated system control parameters 515 can be updated to remove that systematic bias.

In some embodiments, the image region 500 can be added to the image region database 505 as a new reference image region 510. This can be particularly desirable if the compare image regions step 520 determines that the image region 500 is significantly different than all of the reference image regions 510 in the image region database 505. For example, if the compare image regions step 520 computes a difference metric $D_i$ as described above, a sufficiently different test 555 can be used to compare the difference metric $D_i$ determined for the most similar reference image region 510 (i.e., the similar reference image region 525) to a predetermined threshold. If the difference metric $D_i$ exceeds the threshold, then an add image region to database step 560 is used to add the image region 500 to the image region database 505. In this case, a corresponding set of system control parameters 550 can be determined by analyzing the printed image region 540 using a determine system control parameters step 545. For example, the determine system control parameters step 545 can determine any residual registration errors and can modify the system control parameters 530 that were used to print the image region 500 accordingly. The modified system control parameters 550 can then be associated with the image region 500 in the image region database 505. In this way, the content of the image region database 505 can automatically adapt to the content of the print jobs that are printed by the printing system 100.

An optional determine system control parameters step 545 can be used to analyze the printed image region 540 to determine an updated set of system control parameters 550 that would produce improved system performance if they had been used to print the image region 500.

In some embodiments, the system control parameters 515 associated with the reference image regions 510 can be fixed. In other embodiments, performance of the printing system 100 can be monitored (for example, using the quality control sensor 110) and the system control parameters 515 can be updated to reflect any residual errors that are observed. For example, if it is observed that the registration errors which result when the image region 500 is printed using the system control parameters 515 associated with a particular reference image region 510 exceed a predefined threshold or exhibit a systematic bias, then the system control parameters 515 can be updated accordingly.

In some embodiments, the image region database 505 resides in components of the printing system 100, while in other embodiments the image region database 505 is stored at a different location remote from the printing system 100. The remotely stored image region database enables multiple digital printing systems 100 to access a common image region database 505. As additional reference image regions 510 are added to the image region database 505 by any of the connected printing systems 100, each of the other printing systems 100 can benefit from the expanded image region database 505. Local storage of the image region database 505 may be preferred in some embodiments, for example to retain more confidentiality concerning the print jobs.

In some embodiments, the data processing system used to form various steps in the method of FIG. 13 is a component of the printing system 100 such as the processing system 118 (FIG. 1). In other cases, the data processing system can be at a different location remote from the printing system 100. In this case, the analysis of a print job can be performed at the remote location, and the resulting system control parameters 530 can be transmitted to the printing system 100 together with the print job.

Figure 14:
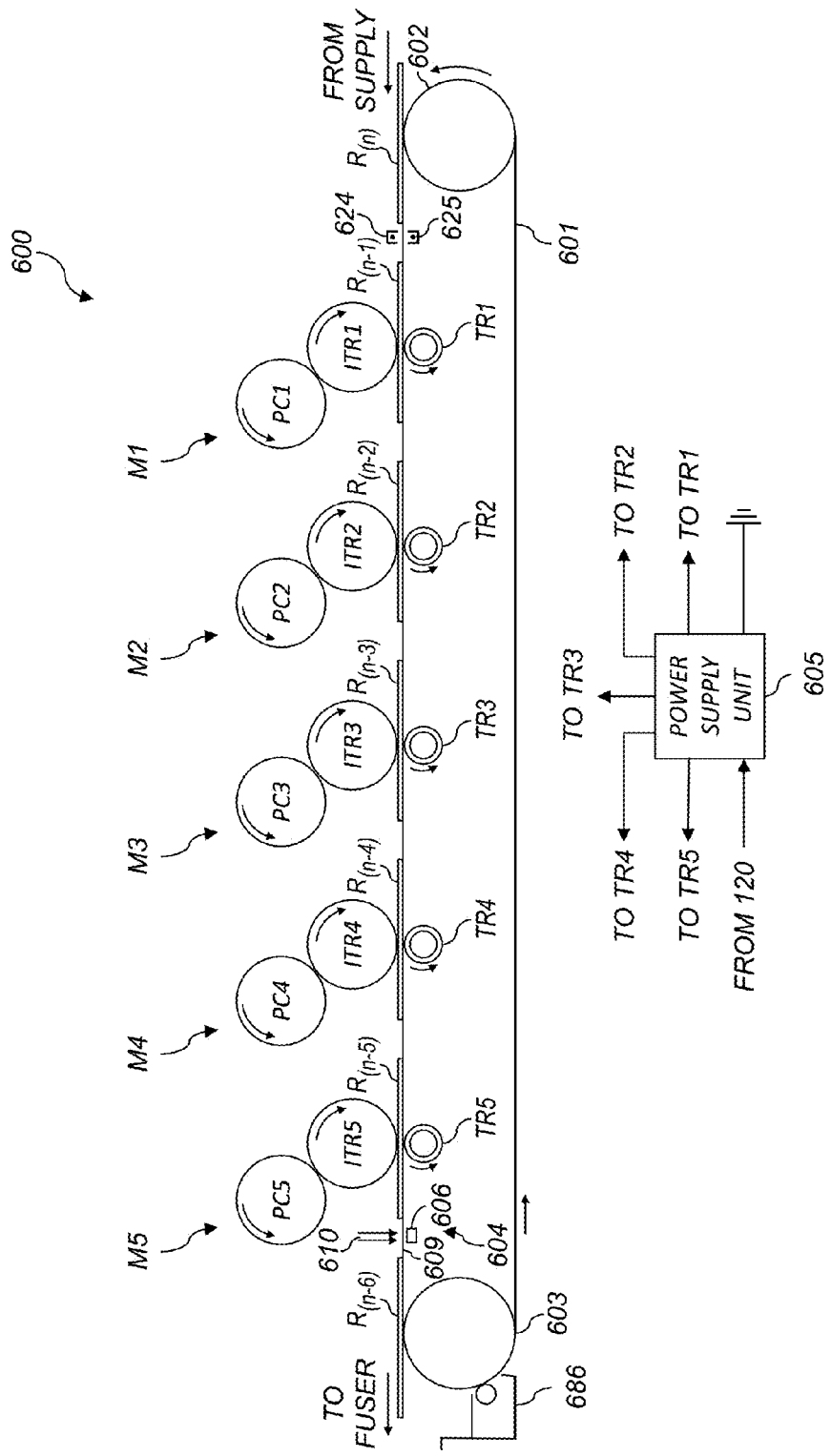
FIG. 14 is a schematic of an electrophotographic printer suitable for use with various embodiments.

While the above embodiments have been described with reference to a web-fed inkjet printing system 100 (FIG. 1), the disclosed methods are also applicable to other types of printing systems such as sheet-fed inkjet printers and electrophotographic printers. FIG. 14 shows an example, of an electrophotographic printing system FIG. 14 shows a simplified side elevational view of an electrophotographic color printer apparatus 600 including five tandemly arranged image-forming modules M1, M2, M3, M4, M5. Each of the image-forming modules M1, M2, M3, M4, M5 generates single-color toner images for transfer to receiver media R successively moved through the image-forming modules M1, M2, M3, M4, M5. Each receiver medium R can have transferred in registration thereto up to five single-color toner images. In a particular embodiment, image-forming module M1 forms black toner images, image-forming module M2 forms yellow toner images, image-forming module M3 forms magenta toner images, and image-forming module M4 forms cyan toner images. Image-forming module M5 can be used optionally to deposit a clear or colorless toner image, or alternatively to deposit a specialty color toner image such as for making proprietary logos or for expanding the color gamut of a resulting print.

Receiver media R are delivered from a supply (not shown) and transported through the image-forming modules M1, M2, M3, M4, M5. The receiver media R are adhered (e.g., electrostatically via coupled corona chargers 624, 625) to an endless transport web 601 entrained around and driven by rollers 602, 603. Each of the image-forming modules M1, M2, M3, M4, M5 includes a respective photoconductive imaging roller PC1, PC2, PC3, PC4, PC5, an intermediate transfer roller ITR1, ITR2, ITR3, ITR4, ITR5, and a transfer backup roller TR1, TR2, TR3, TR4, TR5. Thus in image-forming module M1, a black toner image can be created on photoconductive imaging roller PC1, transferred to intermediate transfer roller ITR1, and transferred again to a sheet of receiver medium $R_{(n-1)}$ moving through a transfer station, which includes a pressure nip formed between the intermediate transfer roller ITR1 and the transfer backup roller TR1. Similar processes occur in the other image-forming modules M2, M3, M4, M5.

A receiver medium $R_n$, arriving from the supply, is shown passing over roller 602 for subsequent entry into the transfer station of the first image-forming module, M1, in which the preceding receiver medium $R_{(n-1)}$ is shown. Similarly, sheets of receiver media $R_{(n-2)}$, $R_{(n-3)}$, $R_{(n-4)}$, and $R_{(n-5)}$ are shown moving respectively through the transfer stations of image-forming modules M2, M3, M4, and M5, respectively. An unfused print formed on receiver medium $R_{(n-6)}$ is moving as shown toward a fuser (not shown) for fusing the unfused print.

The transport web 601 is reconditioned for reuse at cleaning station 686 by cleaning and neutralizing the charges on the opposed surfaces of the transport web 601. A mechanical cleaning station (not shown) for scraping or vacuuming toner off transport web 601 can also be used independently or with cleaning station 686. The mechanical cleaning station can be disposed along the transport web 601 before or after cleaning station 686 in the direction of rotation of transport web 601.

A power supply unit 605 provides individual transfer currents to the transfer backup rollers TR1, TR2, TR3, TR4 and TR5, respectively. A densitometer module, preferably positioned in a location between the last image-forming module M5 and roller 603, includes a densitometer module 604 (utilizing one or more light beams 610 and sensors 606). The densitometer module 604 measures optical densities of a set of process control patches. In some embodiments, the process control patches are printed onto a sheet of the receiver medium R. In other embodiments, the process control patches can be transferred directly onto the transport web 601, for example in an inter-frame area 609 between sheets of the receiver medium R.

Figure 15:
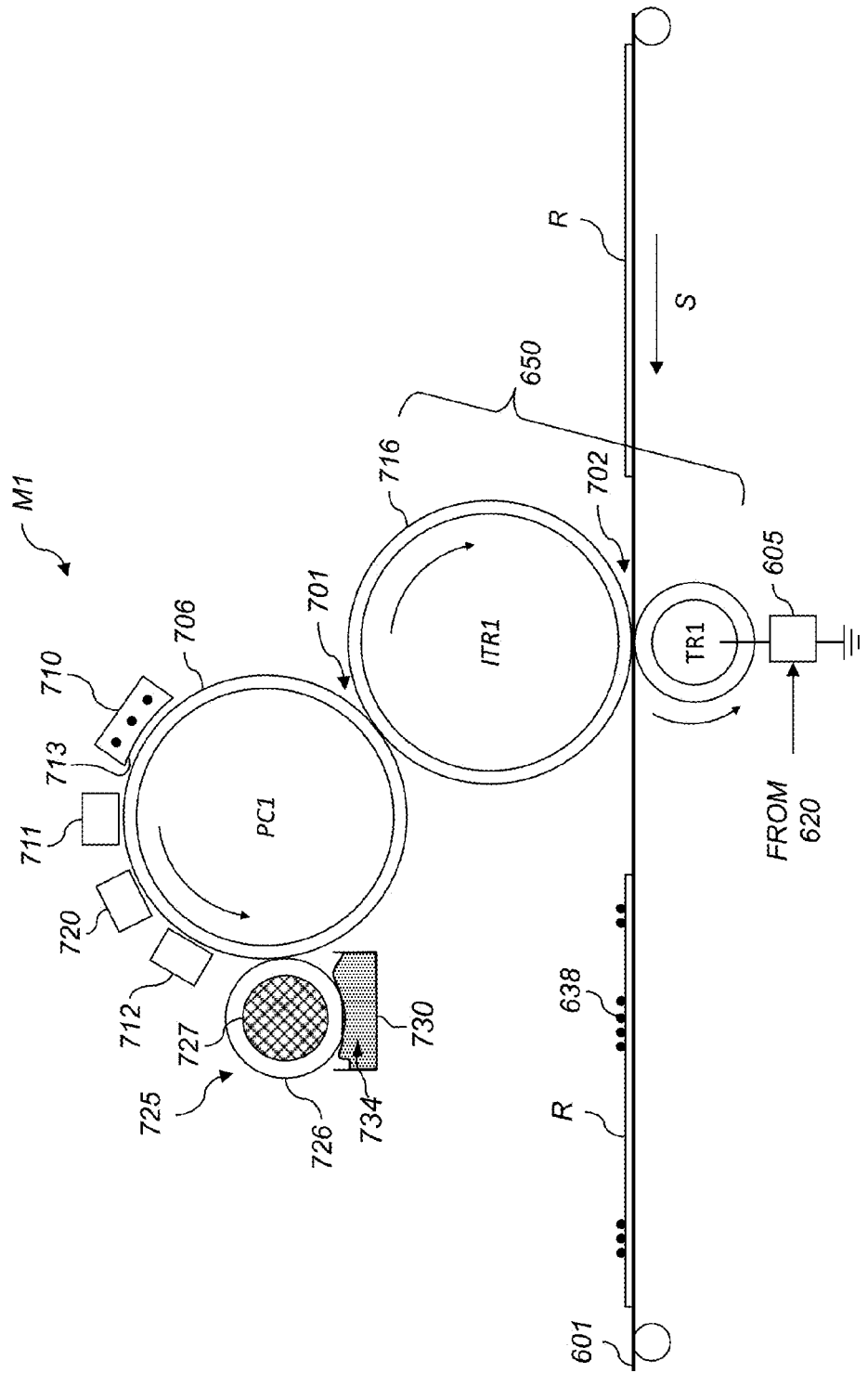
FIG. 15 is a schematic showing additional details for one image forming module of the electrophotographic printer of FIG. 14.

FIG. 15 shows additional details of image forming module M1, which is representative of image forming modules M2, M3, M4 and M5 (FIG. 14). The components of the image forming module M1 are sometimes referred to as an "electrophotographic print engine." Photoreceptor 706 of imaging roller PC1 includes a photoconductive layer formed on an electrically conductive substrate. The photoconductive layer is an insulator in the substantial absence of light so that electric charges are retained on its surface. Upon exposure to light, the charge is dissipated. In various embodiments, photoreceptor 706 is part of, or disposed over, the surface of imaging roller PC1. Photoreceptors can include a homogeneous layer of a single material such as vitreous selenium or a composite layer containing a photoconductor and another material. Photoreceptor 706 can also contain multiple layers.

Charging subsystem 710 uniformly electrostatically charges photoreceptor 706 of imaging roller PC1. Charging subsystem 710 includes a grid 713 having a selected voltage. Additional necessary components provided for control can be assembled about the various process elements of the respective image forming modules. Meter 711 measures the uniform electrostatic charge provided by charging subsystem 710.

An exposure subsystem 720 is provided for selectively modulating the uniform electrostatic charge on photoreceptor 706 in an image-wise fashion by exposing photoreceptor 706 to electromagnetic radiation to form a latent electrostatic image. The uniformly-charged photoreceptor 706 is typically exposed to actinic radiation provided by selectively activating particular light sources in an LED array or a laser device outputting light directed onto photoreceptor 706. In embodiments using laser devices, a rotating polygon (not shown) is used to scan one or more laser beam(s) across the photoreceptor in the fast-scan direction. One pixel site is exposed at a time, and the intensity or duty cycle of the laser beam is varied at each dot site. In embodiments using an LED array, the array can include a plurality of LEDs arranged next to each other in a line, all dot sites in one row of dot sites on the photoreceptor can be selectively exposed simultaneously, and the intensity or duty cycle of each LED can be varied within a line exposure time to expose each pixel site in the row during that line exposure time.

As used herein, an "engine pixel" is the smallest addressable unit on photoreceptor 706 which the exposure subsystem 720 (e.g., the laser or the LED) can expose with a selected exposure different from the exposure of another engine pixel. Engine pixels can overlap (e.g., to increase addressability in the slow-scan direction S). Each engine pixel has a corresponding engine pixel location, and the exposure applied to the engine pixel location is described by an engine pixel level.

The exposure subsystem 720 can be a write-white or write-black system. In a write-white or charged-area-development (CAD) system, the exposure dissipates charge on areas of photoreceptor 706 to which toner should not adhere. Toner particles are charged to be attracted to the charge remaining on photoreceptor 706. The exposed areas therefore correspond to white areas of a printed page. In a write-black or discharged-area development (DAD) system, the toner is charged to be attracted to a bias voltage applied to photoreceptor 706 and repelled from the charge on photoreceptor 706. Therefore, toner adheres to areas where the charge on photoreceptor 706 has been dissipated by exposure. The exposed areas therefore correspond to black areas of a printed page.

In a preferred embodiment, a meter 712 is provided to measure the post-exposure surface potential within a patch area of a latent image formed from time to time in a non-image area on photoreceptor 706. Other meters and components can also be included (not shown).

A development station 725 includes toning shell 726, which can be rotating or stationary, for applying toner of a selected color to the latent image on photoreceptor 706 to produce a visible image on photoreceptor 706 (e.g., of a separation corresponding to the color of toner deposited at this image forming module). Development station 725 is electrically biased by a suitable respective voltage to develop the respective latent image, which voltage can be supplied by a power supply (not shown). Developer 734 is provided to toning shell 726 by a developer supply 730, which can include components such as a supply roller, auger, or belt. Toner is transferred by electrostatic forces from development station 725 to photoreceptor 706. These forces can include Coulomb forces between charged toner particles and the charged electrostatic latent image, and Lorentz forces on the charged toner particles due to the electric field produced by the bias voltages.

In some embodiments, the development station 725 employs a two-component developer that includes toner particles and magnetic carrier particles. The exemplary development station 725 includes a magnetic core 727 to cause the magnetic carrier particles near toning shell 726 to form a "magnetic brush," as known in the electrophotographic art. Magnetic core 727 can be stationary or rotating, and can rotate with a speed and direction the same as or different than the speed and direction of toning shell 726. Magnetic core 727 can be cylindrical or non-cylindrical, and can include a single magnet or a plurality of magnets or magnetic poles disposed around the circumference of magnetic core 727. Alternatively, magnetic core 727 can include an array of solenoids driven to provide a magnetic field of alternating direction. Magnetic core 727 preferably provides a magnetic field of varying magnitude and direction around the outer circumference of toning shell 726. Further details of magnetic core 727 can be found in U.S. Pat. No. 7,120,379 to Eck et al., and in U.S. Pat. No. 6,728,503 to Stelter et al., the disclosures of which are incorporated herein by reference. Development station 725 can also employ a mono-component developer comprising toner, either magnetic or non-magnetic, without separate magnetic carrier particles.

Transfer subsystem 650 includes intermediate transfer roller ITR1 and transfer backup roller TR1 for transferring the respective print image from photoreceptor 706 of imaging roller PC1 through a first transfer nip 701 to surface 716 of intermediate transfer roller ITR1, and thence to a receiver medium R at a second transfer nip 702. The receiver medium R receives a respective toned print image 638 from each image forming module in superposition to form a composite image thereon. The print image 638 is, for example, a separation of one color, such as black. Receiver medium R is transported by transport web 601. Transfer to the receiver medium R is effected by an electrical field provided to transfer backup roller TR1 by power supply unit 605, which is controlled by control unit 620 (FIG. 3). Receiver medium R can be any object or surface onto which toner can be transferred by application of the electric field.

In the illustrated embodiment, the toner image is transferred from the photoreceptor 706 to the intermediate transfer roller ITR1, and from there to the receiver medium R. Registration of the separate toner images is achieved by registering the separate toner images on the receiver medium R, as is done with the NexPress 2100. In some embodiments, a single transfer member is used to sequentially transfer toner images from each color channel to the receiver medium R. In other embodiments, the separate toner images can be transferred in register directly from the photoreceptor 706 in the respective image forming module M1, M2, M3, M4, M5 to the receiver medium R without using an intermediate transfer roller. Either transfer process is suitable when practicing this invention. An alternative method of transferring toner images involves transferring the separate toner images, in register, to a transfer member and then transferring the registered image to a receiver.

A control system sends control signals to the charging subsystem 710, the exposure subsystem 720, and the respective development station 725 of each image forming module M1, M2, M3, M4, M5 (FIG. 14), among other components. Each image forming module M1, M2, M3, M4, M5 can also have its own respective controller system.

Further details regarding exemplary printer apparatus 600 are provided in U.S. Pat. No. 6,608,641 to Alexandrovich et al., and in U.S. Patent Application Publication 2006/0133870, to Ng et al., the disclosures of which are incorporated herein by reference.

In accordance with the present invention, color registration in the electrophotographic color printer apparatus 600 can be corrected by using a color registration model to determine predicted color registration errors 445 as a function of ink coverage characteristics 430 as has been discussed with respect to FIGS. 7 and 11. In this case, the "ink" is an electrophotographic toner.

In other embodiments, color registration errors can be reduced by using an image region database 505 which stores reference image regions 510 together with associated system control parameters 515 as has been discussed with reference to FIG. 13. In this case, the system control parameters 515 can include parameters for correcting the color registration of the printed image. The color registration can be controlled in various ways such as by adjusting the image data sent to the exposure subsystem 720, by adjusting the timing for the exposure subsystem 720 writes the image data onto the photoreceptor 706, or by adjusting which exposure elements (e.g., LEDs) in the exposure subsystem 720 are used to print image pixels of the image data.

The system control parameters 515 can also include one or more electrophotographic print engine control parameters that are used to control a setting on the electrophotographic color printer apparatus 600. For example, the system control parameters 515 can include charging level settings for the charging subsystem 710, exposure level settings for the exposure subsystem 720, bias voltage settings for the development station 725, bias settings for the transfer subsystem 650 or fuser settings for the fusing subsystem. The system control parameters 515 can also control system attributes such as printing speed.

The invention has been described in detail with particular reference to certain preferred embodiments thereof, but it will be understood that variations and modifications can be effected within the spirit and scope of the invention.

PARTS LIST 100 printing system
102 print module
104 print module
106-1 linehead
106-2 linehead
106-3 linehead
106-4 linehead
108 dryer
110 quality control sensor
111 web tension system
112 print medium
114 transport direction
116 turnover module
118 processing system
120 storage system
200 printhead
202 nozzle array
204 support structure
206 heat
300 print job
302 page
304 page
306 page
308 page
310 page
312 page
314 page
316 page
390 plot
400 reference color plane
402 color plane
404 in-track direction
406 cross-track direction
408 color plane
410 color plane
414 text region
416 object region
418a ink coverage plot
418b ink coverage plot
418c ink coverage plot
418d ink coverage plot
420 document
420a document
420b document
420c document
420d document
422 centerline
425 analyze document step
430 ink coverage characteristics
435 color registration model
440 determine predicted color registration errors step
445 predicted color registration errors
450 determine image plane correction values step
455 image plane correction values 460 print document step
465 printed document
470 determine residual registration errors step
475 residual registration errors
480 update color registration model step
490 image region
492 set of in-track positions
494 in-track position
495 analyze image region step
496 determine image data correction values
497 image data correction values
498 print image data step
499 printed image data
500 image region
505 image region database
510 reference image region
515 system control parameters
520 compare image regions step
525 similar reference image region
530 system control parameters
535 print image region step
540 printed image region
545 determine system control parameters step
550 system control parameters
555 sufficiently different? decision step
560 add image region to database step
600 printer apparatus
601 transport web
602 roller
603 roller
604 densitometer module
605 power supply unit
606 sensor
609 inter-frame area
610 light beam
620 control unit
624 corona charger
625 corona charger
638 print image
650 transfer subsystem
686 cleaning station
701 first transfer nip
702 second transfer nip
706 photoreceptor
710 charging subsystem
711 meter
712 meter
713 grid
716 surface
720 exposure subsystem
725 development station
726 toning shell
727 magnetic core
730 developer supply
734 developer
D1 document
D2 document
D3 document
DN document
ITR1 intermediate transfer roller
ITR2 intermediate transfer roller
ITR3 intermediate transfer roller
ITR4 intermediate transfer roller
ITR5 intermediate transfer roller
M1 image-forming module
M2 image-forming module
M3 image-forming module
M4 image-forming module
M5 image-forming module
PC1 imaging roller
PC2 imaging roller
PC3 imaging roller
PC4 imaging roller
PC5 imaging roller
R receiver medium
S slow-scan direction
TR1 transfer backup roller
TR2 transfer backup roller
TR3 transfer backup roller
TR4 transfer backup roller
TR5 transfer backup roller

The invention claimed is:

1. A method for controlling a digital printing system, comprising:
receiving digital image data for an image region to be printed by the digital printing system;
designating an image region database stored in a processor-accessible memory including data characterizing a plurality of reference image regions, each reference image region having one or more associated system control parameters that are appropriate for use in printing the reference image region on the digital printing system;
using a data processing system to compare the image region to be printed with the reference image regions in the image region database and select a reference image region that is sufficiently similar to the image region to be printed; and
using the digital printing system to print the received digital image data for the image region by applying one or more colorants onto a print medium, wherein the digital printing system includes an electrophotographic printing module that is controlled using the system control parameters associated with the selected similar reference image region during the printing of at least a subset of the image region.

2. The method of claim 1 wherein the data characterizing a reference image region includes a parametric representation of the reference image region.

3. The method of claim 2 wherein the determination of the parametric representation includes:
determining an ink coverage profile representing a distribution of ink within the reference image region; and
representing the ink coverage profile using a series expansion based on a set of orthogonal basis functions;
wherein coefficients determined for a plurality of the basis functions are designated to be parameters for the parametric representation.

4. The method of claim 1 wherein the data characterizing a reference image region includes digital image data for the reference image region, the digital image data including pixel values for an array of image pixels.

5. The method of claim 4 wherein the comparison of the image region to be printed with a particular reference image region includes computing a difference image representing a difference between digital image data for the image region to be printed and the digital image data for the particular reference image region.

6. The method of claim 5 further including determining a difference metric by performing a statistical analysis on the difference image.

7. The method of claim 5 wherein the difference image has a lower spatial resolution than the image region to be printed.

8. The method of claim 7 wherein the reference image regions in the image region database are stored at the lower spatial resolution, and wherein the digital image data for the image region to be printed is down-sample to the lower spatial resolution before the difference image is computed.

9. The method of claim 1 wherein difference parameters are determined representing differences between the reference image regions and the image region to be printed.

10. The method of claim 9 wherein the reference image region having the smallest corresponding difference parameter is designated to be the selected similar reference image region.

11. The method of claim 9 wherein the selected reference image region is designated to be sufficiently similar to the image region to be printed if the difference parameter is smaller than a predefined difference threshold.

12. The method of claim 1 wherein one or more system configuration parameters are associated with the reference image regions in the image region database, and wherein the selection of the similar reference image region includes comparing the system configuration parameters associated with the reference image regions to system configuration parameters to be used when the received digital image data for the image region is printed.

13. The method of claim 1 wherein the reference image regions in the image region database are selected to be representative of different types of image regions that are commonly printed.

14. The method of claim 1 wherein the image region to be printed is added to the image region database as a new reference digital image.

15. The method of claim 14 wherein the image region to be printed is added to the image region database if it is determined to be sufficiently different from all of the reference image regions in the image region database.

16. The method of claim 1 wherein the digital printing system is a color printing system that prints images having a plurality of color channels, and wherein the system control parameters include one or more color registration parameters that are used to control the registration between two or more different color channels.

17. The method of claim 16 wherein the color registration parameters include an in-track shift value, a cross-track shift value, an in-track magnification factor, a cross-track magnification factor, or an image rotation value.

18. The method of claim 1 wherein the digital printing system is a color printing system that prints images having a plurality of color channels, and wherein the system control parameters include a color adjustment parameter that is used to adjust color reproduction characteristics.

19. The method of claim 1 wherein the digital printing system has a plurality of different print modes, and wherein the system control parameters include a print mode selection parameter that is used to select between the different print modes.

20. The method of claim 1 wherein the digital printing system includes a media de-curling subsystem for reducing curl in the print medium, and wherein the system control parameters include a de-curling subsystem control parameter that is used to control a setting on the de-curling subsystem.

21. The method of claim 1 wherein the electrophotographic printing module includes an electrophotographic print engine, and wherein the system control parameters include one or more electrophotographic print engine control parameters that are used to control a setting on the electrophotographic print engine.

22. The method of claim 1 wherein the processor-accessible memory used to store the image region database and the data processing system used to compare the image region to be printed with the reference image regions in the image region database are at a different location than the digital printing system.

23. The method of claim 1 wherein the processor-accessible memory used to store the image region database and the data processing system used to compare the image region to be printed with the reference image regions in the image region database are components of the digital printing system.

24. The method of claim 1 wherein the digital printing system prints on individual sheets of print medium, and wherein the image region to be printed corresponds to a single sheet of print medium.

25. The method of claim 1 wherein the digital printing system prints on a continuous web of print medium.

* * * * *